(12) United States Patent
Leitner

(10) Patent No.: US 12,719,279 B2
(45) Date of Patent: Aug. 25, 2026

(54) GRAPHICAL USER INTERFACE OF A POWER MANAGEMENT SYSTEM

(71) Applicant: YouSolar, Inc., El Cerrito, CA (US)

(72) Inventor: Arnold Leitner, El Cerrito, CA (US)

(73) Assignee: YouSolar, Inc., El Cerrito, CA (US)

( * ) Notice: Subject to any disclaimer, the term of this patent is extended or adjusted under 35 U.S.C. 154(b) by 782 days.

(21) Appl. No.: 18/066,917

(22) Filed: Dec. 15, 2022

(65) Prior Publication Data

US 2023/0198260 A1 Jun. 22, 2023

Related U.S. Application Data

(60) Provisional application No. 63/292,657, filed on Dec. 22, 2021.

(51) Int. Cl.
*H02J 3/28* (2026.01)
*G06F 3/04817* (2022.01)
*H02J 13/10* (2026.01)

(52) U.S. Cl.
CPC ............ *H02J 3/28* (2013.01); *G06F 3/04817* (2013.01)

(58) Field of Classification Search
CPC ............ G06F 3/04817; H02J 13/00001; H02J 2300/24; H02J 3/14; H02J 3/28; H02J 3/381
See application file for complete search history.

(56) References Cited

U.S. PATENT DOCUMENTS 5,021,976 A 6/1991 Wexelblat et al.
D658,204 S 4/2012 Jones
8,335,595 B2 * 12/2012 Tolnar ...................... H02J 3/28 700/286

(Continued)

OTHER PUBLICATIONS

Generac Orientation Video for Monitoring App, Apr. 6, 2021, pp. 1-10 https://www.youtube.com/watch?v=fGLgTvYFnnQ (Year: 2021).*

(Continued)

*Primary Examiner* — Scott T Baderman
*Assistant Examiner* — Mario M Velez-Lopez
(74) *Attorney, Agent, or Firm* — Dorsey & Whitney LLP

(57) ABSTRACT

A power management system includes a controller configured to receive status information for one or more energy sources coupled to the power management system and to provide energy from the one or more energy sources to at least one energy sink connected to the power management system and a computing device in communication with the controller. The computing device includes a display, a processor in communication with the display, and memory in communication with the processor, the memory comprising instructions, which when executed by the processor, cause a graphical user interface to be provided on the display. The graphical user interface is configured to display a graphical representation of a flow of energy from the one or more energy sources to the at least one energy sink, and dynamically update the graphical representation to reflect changes in the flow of energy. The graphical representation includes a central icon and a plurality of peripheral icons arranged around the central icon and representing the at least one energy sink and each of each of the one or more energy sources.

6 Claims, 17 Drawing Sheets
(13 of 17 Drawing Sheet(s) Filed in Color)

(56) References Cited

U.S. PATENT DOCUMENTS

| | | | | |
|---|---|---|---|---|
| 8,684,929 | B2 * | 4/2014 | Heaton | G16H 15/00 600/365 |
| D704,733 | S | 5/2014 | Jewitt | |
| D743,977 | S | 11/2015 | Dela Cruz et al. | |
| D805,535 | S | 12/2017 | Danielyan et al. | |
| D812,634 | S | 3/2018 | Tuthill et al. | |
| D820,297 | S | 6/2018 | Gardner et al. | |
| D826,257 | S | 8/2018 | Thiel et al. | |
| 10,524,393 | B2 | 12/2019 | Leitner | |
| 10,809,678 | B2 * | 10/2020 | Nasirian | H02J 3/18 |
| D911,371 | S | 2/2021 | Zhao et al. | |
| D914,759 | S | 3/2021 | Mariani et al. | |
| D934,270 | S | 10/2021 | Thiel et al. | |
| D936,697 | S | 11/2021 | Hosokuni et al. | |
| D966,332 | S | 10/2022 | Hsu | |
| 11,769,094 | B2 * | 9/2023 | Ayoola | B60L 53/62 320/109 |
| 2008/0120575 | A1 | 5/2008 | Sato et al. | |
| 2010/0161147 | A1 * | 6/2010 | Adam | G06Q 10/04 700/291 |
| 2010/0198421 | A1 * | 8/2010 | Fahimi | H02J 3/32 700/291 |
| 2012/0218926 | A1 | 8/2012 | Wang et al. | |
| 2013/0198691 | A1 | 8/2013 | Akita | |
| 2013/0338843 | A1 * | 12/2013 | Iravani | H02J 3/14 700/295 |
| 2015/0109133 | A1 * | 4/2015 | Andre | H02J 3/32 340/657 |
| 2015/0186904 | A1 * | 7/2015 | Guha | G06Q 10/06316 705/7.26 |
| 2016/0179353 | A1 * | 6/2016 | Iskander | G06F 1/163 715/765 |
| 2016/0210767 | A1 | 7/2016 | Ohrn et al. | |
| 2017/0277424 | A1 * | 9/2017 | Witkowski | G06F 3/0488 |
| 2018/0269689 | A1 * | 9/2018 | Rodriguez | H02J 3/46 |
| 2020/0161870 | A1 * | 5/2020 | Forbes, Jr. | G05F 1/66 |
| 2020/0274375 | A1 * | 8/2020 | Griffiths | H02J 7/1423 |
| 2021/0028693 | A1 * | 1/2021 | Motoyama | H02J 9/062 |
| 2022/0121260 | A1 * | 4/2022 | King | G06F 1/28 |
| 2023/0098485 | A1 * | 3/2023 | Shaaban | G06F 3/04842 705/26.4 |

OTHER PUBLICATIONS

Fimer app interface data , Available Sep. 2021, pp. 1-15 https://community.home-assistant.io/ "Custom Component:ABB/Power-One/FIMER PV Inverters—SunSpec Modbus TCP", (Year: 2021).*

Fimer—Energy Bites—Energy Viewer Monitoring App, Jun. 29, 2021—pp. 1 https://www.youtube.com/watch?v=ep6qBPHDXR8&t=40s (Year: 2021).*

Design U.S. Appl. No. 29/819,938 titled "Portion of a Display Screen With Graphical User Interface" filed Dec. 17, 2021.

U.S. Appl. No. 29/819,938 , Non-Final Office Action, Aug. 17, 2023, 7 pages.

* cited by examiner

GRAPHICAL USER INTERFACE OF A POWER MANAGEMENT SYSTEM

CROSS-REFERENCE TO RELATED APPLICATION

This application claims the filing benefit of U.S. Provisional Application No. 63/292,657, filed Dec. 22, 2021. This application is incorporated by reference herein in its entirety and for all purposes.

FIELD

The present disclosure relates generally to a power management system, and more specifically to a graphical user interface thereof.

BACKGROUND

Renewable energy, such as that produced by solar, wind and/or hydro power generation systems, continues to gain popularity and importance in addressing the climate challenge created by modern society. Because the availability of renewable energy can be intermittent, energy storage is important to make reliance on renewable energy practical. Various energy storage solutions have been developed, some of which are now marketed directly to consumers (e.g., for residential use). One such system is the modular electrical system described in U.S. Pat. No. 10,524,393, titled "Multi-module electrical system containing with an integral air duct," the contents of which are incorporated herein by reference in its entirety for any purpose. Another modular storage solution is described in U.S. Ser. No. 63/280,930, titled "Modular energy storage system with interlocking stackable modules," the contents of which is also incorporated herein by reference in in its entirety for any purpose. To that end, improved and more user-friendly solutions for managing and/or controlling the various components of a user's power eco system or local power system may be desired, and developers, thus, continue to seek improvements thereto.

SUMMARY

An example power management system includes a controller configured to receive status information for one or more energy sources coupled to the power management system and to provide energy from the one or more energy sources to at least one energy sink connected to the power management system and a computing device in communication with the controller. The computing device comprises a display, a processor in communication with the display, and memory in communication with the processor, the memory comprising instructions, which when executed by the processor, cause a graphical user interface to be provided on the display, wherein the graphical user interface is configured to: display a graphical representation of a flow of energy from the one or more energy sources to the at least one energy sink, and dynamically update the graphical representation to reflect changes in the flow of energy, and wherein the graphical representation comprises a central icon and a plurality of peripheral icons arranged around the central icon and representing the at least one energy sink and each of each of the one or more energy sources.

An additional example of a power management system includes a controller configured to receive status information for at least two power sources coupled to the power management system and to provide energy to a load connected to the power management system and a computing device in communication with the controller. The computing device includes a display, a processor in communication with the display, and a memory in communication with the processor, the memory comprising instructions, which when executed by the processor, cause a graphical user interface to be provided on the display, wherein the graphical user interface is configured to concurrently display the corresponding status information of each of the at least two power sources, wherein the status of the at least two power sources is each graphically represented on a clock face by a different circular status graphic concurrently displayed with the clock face and dynamically updated during a period of time represented by the clock face.

An example method of displaying and dynamically updating, on a graphical user interface, status information for one or more energy sources and at least one sink connected to a power management system includes graphically representing, in a display screen, each of a plurality of energy sources and a load by a respective peripheral icon, wherein the peripheral icons are arranged around a central traffic flow icon, graphically representing in the display screen a flow of energy by respective arrows connecting each of the peripheral icons and the central traffic flow icon, wherein a direction of the arrow corresponds to, and is dynamically updated to reflect, the direction of the flow of energy at any given time, graphically representing an energy level status of one or more of the plurality of energy sources and a consumption status of the load by a visual characteristic of the respective peripheral icon other than a numerical value, and dynamically updating the visual characteristic responsive to changes in the energy level status or the consumption status.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The accompanying drawings, which are incorporated in and constitute a part of the specification, illustrate examples of the disclosure and, together with the general description given above and the detailed description given below, serve to explain the principles of these examples.

Figure 1:
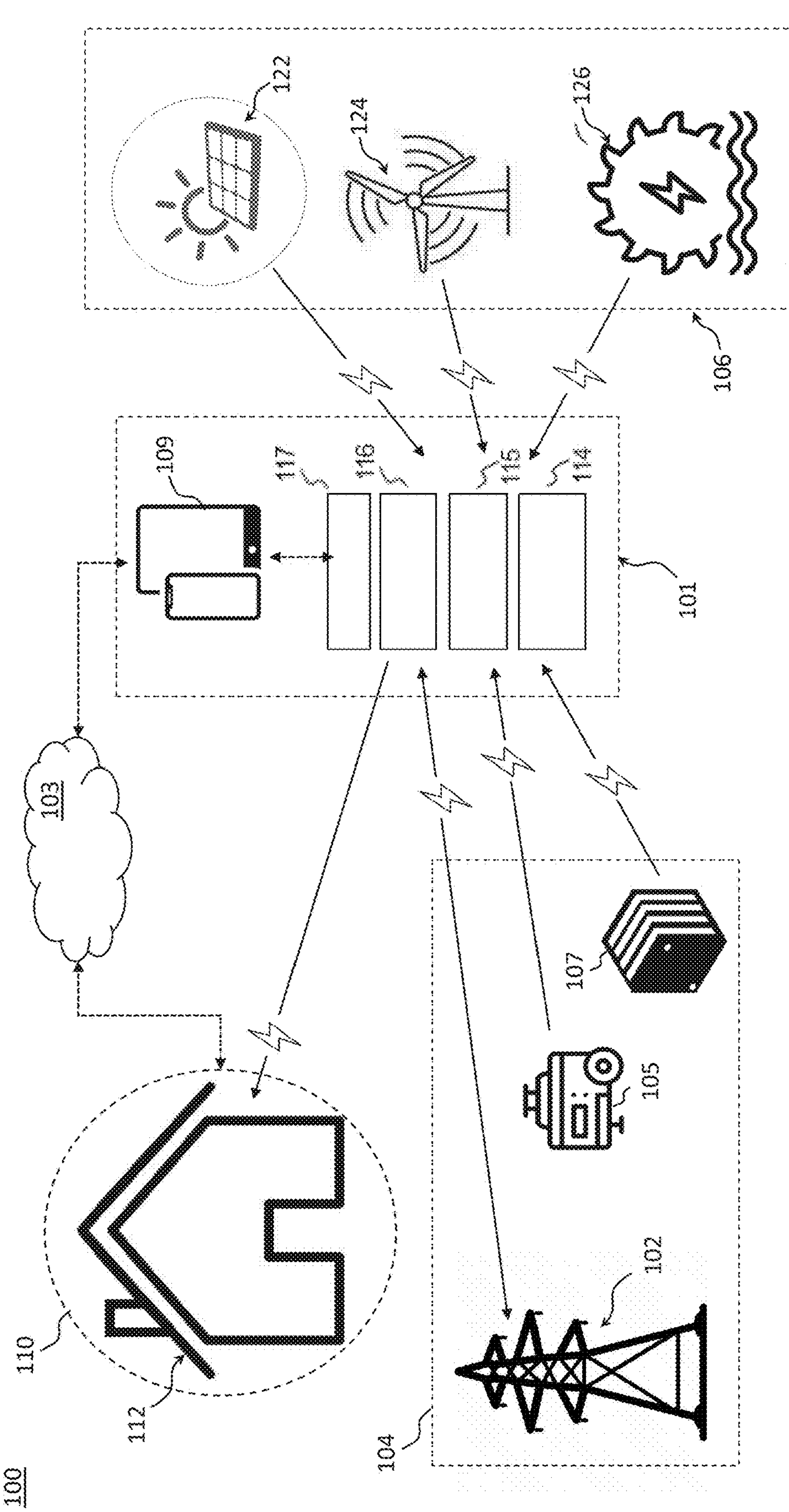
FIG. 1 shows a power management system according to some embodiments of the present disclosure within an example operational environment (e.g. local power system or power eco system).

The description herein will be more fully understood with reference to these figures in which components may not be drawn to scale, and which are presented as various embodiments of the present invention and should not be construed as a complete depiction of the scope of the present disclosure.

DETAILED DESCRIPTION

The elements and functionality of a power management system's graphical user interface according to the present disclosure is described with reference to the power eco system or the local power system 100 illustrated in FIG. 1. This is an example local power system 100 illustrated solely to aid in understanding the invention but it will be understood that the invention herein applies to various other local power systems or power eco systems (or use case scenarios). A power management system 101 may cooperatively or electrically connect (e.g., to control) various elements of the local power system 100. All elements may electrically connect in at least two ways, to transmit power and to transmit data or information. For example, the power management system 101 may electrically connect to one or more devices or power sources to transmit information and, or electrical energy or power. The electrical connections may require two methods or modes of connection, or a single mode or method of connection, to provide for the transmission of both information and power. In the example in FIG. 1, power may be provided to a load 110 (e.g., shown here as a residential building 112, but could be a commercial building and/or any number or combination of electricity-consuming systems in any type of facility or installation) by the grid 102 and/or by one or more off-grid sources, such as one or more renewable energy sources 106 or dispatchable power sources 104. The local power system 100 may further include an inverter 116 for use with power sources providing direct current. The one or more energy sources, e.g., the off-grid energy sources, may be operatively or electrically connected to one or more of a controller 117, the inverter 116, additional power conversion devices 115 (such as a rectifier, transformer, etc.), or an energy storage unit (or simply battery) 114 for storing any excess energy not consumed at the time of generation. The energy storage unit 114 may be part of a power management system 101 which may regulate the delivery of power obtained from the off-grid sources to the load 110. The power management system 101 may thus include various electronic components to facilitate the conversion and storage of energy into the battery 114, such as an inverter 116 and, or additional power conversion devices 115, as well as including a power traffic controller (or simply controller) 117 that controls the flow of power from the source(s) to the load 110 and in and out of the battery 114, which may all be co-located e.g., as part of a modular system comprising a plurality of modules configured to be stacked into a single power management tower or unit. In some embodiments, these electronic components, which may be co-located with the battery unit 114, may be implemented by a modular system according to any of the examples in U.S. Pat. No. 10,524,393 and/or U.S. Ser. No. 63/280,930, incorporated herein by reference in their entirety. Any other suitable energy storage solution may be used to implement the energy storage unit 114. An example power management system 101 may include electronic components that provide a rectifier unit (or module) 115 to which one or a plurality of AC sources (e.g., utility/grid power and/or a generator) may be connected, an input module such as solar input module with any suitable number of converters for connecting the solar array or other renewable energy source to the system 101, one or more inverter modules optionally including an inverter 116 that can provide excess energy from renewable sources 106 to the grid 102, a communications and power traffic controller 117, one or more capacitor modules 115 for reducing fluctuations on the DC bus, and modules to expand the energy storage unit 114. Any suitable number and combination of electronic components may be included in a system 100 according to various embodiments herein.

As noted above, a load 110 is part of the eco system or local power system 100 and may consume at least a portion of the available energy. The load 110 may be a residential home 112 or any other type of facility or installation, such a commercial building, a hospital, a temporary/field facility or installation (on or off the grid) that may require electrical energy at any given time. Also, while illustrated as a single residential home 112, it will be understood that, in some embodiments, the load 110 may represent, and thus refer to, multiple buildings, facilities or installation connected to the power management system 101. The load 110 (e.g., residential home 112) may be powered by any number and/or combination of power sources including dispatchable sources 104, such as on-site sources (e.g., a generator 105, a fuel cell 107) or off-side dispatchable sources such as utility (or grid) power 102 and/or one or more renewable power source 106 (e.g., solar 122, wind 124, hydro 126, etc.). In some embodiments, only off-grid (or grid alternative) resources may be available, and thus the system 100 may utilize one or more grid alternative dispatchable sources 104 (e.g. a generator 105, a fuel cell 107, etc.) and/or one or more renewable sources 106.

The power management system 101 may be associated with a graphical user interface 270, which may be provided on a computing device 109 (e.g., tablet, smartphone, personal computer, laptop, or any other computing device). The computing device 109 may be communicatively connected or electrically connected to the energy storage unit 114 via a wired or wireless connection. In some embodiments, the computing device 109 may communication with the energy storage unit 114, or additional components of the system 100, via a wireless network 103, such as via a LAN or WAN of the residential home 112. The wireless network 103 may also be a cloud network 103 that stores information pertaining to the local power system 100. The information may be accessed by the computing device 109 to present the relevant information to the user. In some embodiments, the computing device 109 may communicate directly with the energy storage unit 114 via a local wireless network (or hotspot) provided by the energy storage unit 114 or a controller 117 of the power management system 101. In some embodiments, the computing device 109 may additionally or alternatively communicate with the energy storage unit 114 or the controller 117 via a wired connection, for example during a setup of the system 101.

Figure 2:
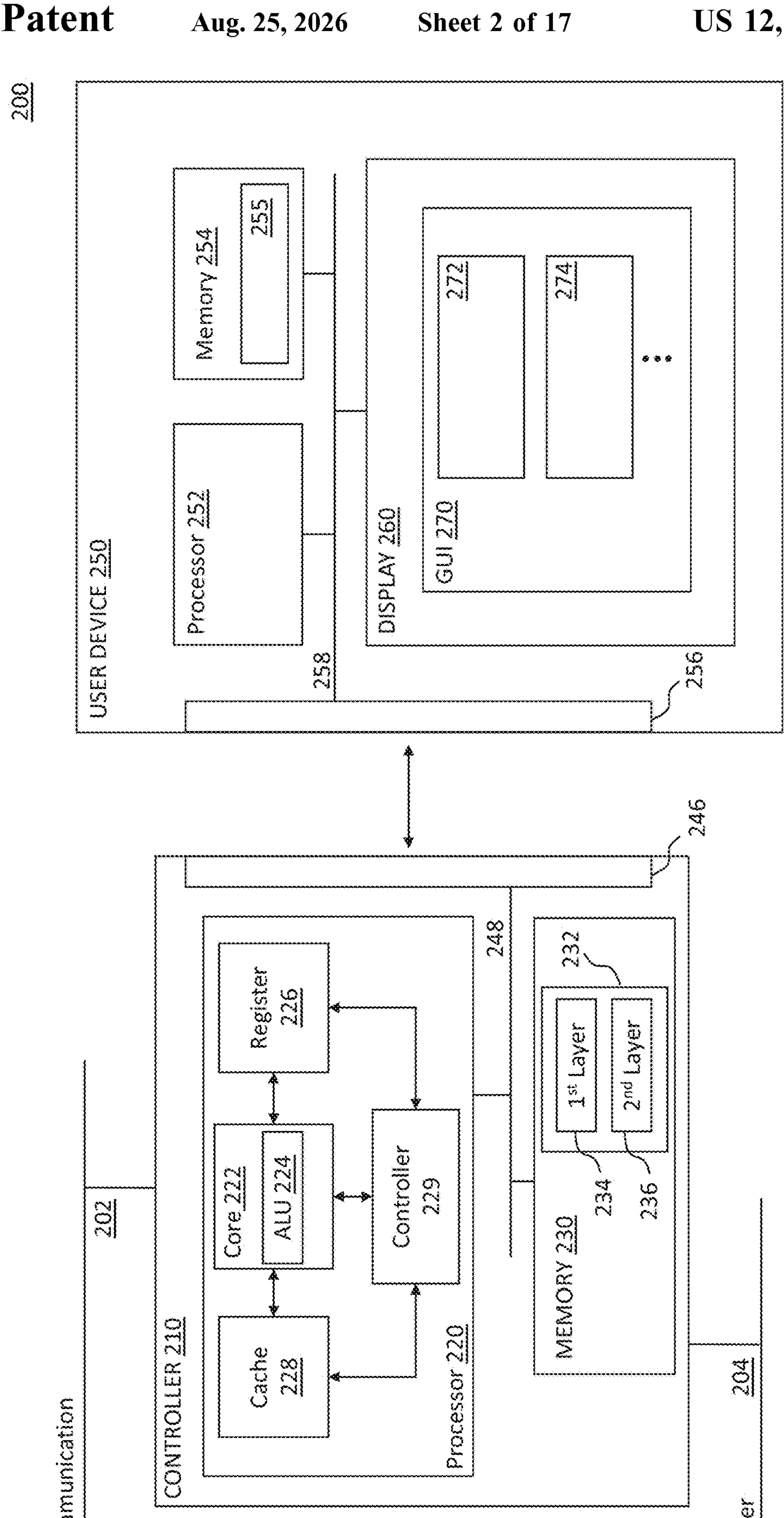
FIG. 2 shows a block diagram of components of a power management system according to the present disclosure.

FIG. 2 shows a block diagram of components of a power management system 200 according to some embodiments of the present disclosure. The power management system 200 can be used to implement, at least in part, the power management system 101 of FIG. 1. The power management system 200 may also be the same or similar as, or include the same or similar components or functions, as the power management system 101. Shown in FIG. 2 are a controller 210, which may be the controller 117, connected to the communication network (e.g., a communication bus 202) of the power storage unit 114 or controller 210. In some embodiments, the controller 210 may reside in the power storage unit 114 and may also be connected to the power bus 204 of the power storage unit 114. While shown separately, the electrical lines associated with each bus need not be physically separate in all embodiments. In some embodiments, the communication and power signals may be provided to the controller 210 via a single bus, which may include any suitable combination of parallel and/or serial connections. The communication bus 202 and power bus 204 may be referred to collectively or individually as electrical connections. By combining the communication bus 202 and the power bus 204 into a single electrical connection between the components of the system 100, the electrical connections may be maintained during events that may otherwise inhibit or limit information transfer, such as wireless communication networks failing during a grid outage disrupting an internet service. The controller 210 may include a processor 220, memory 230 and a communication interface 246 (e.g., a WiFi interface) communicatively connected via an internal bus 248.

The processor 220 may be any suitable processor type including, but not limited to, a microprocessor, a microcontroller, a digital signal processor (DSP), a field programmable array (FPGA) where the FPGA has been programmed to form a processor, a graphical processing unit (GPU), an application specific circuit (ASIC) where the ASIC has been designed to form a processor, or a combination thereof. The processor 220 may include one or more cores 222, which may include one or more arithmetic logic units (ALU) 224. In some embodiments, the core(s) 222 may include one or more floating point logic units (FPLU) and/or digital signal processing units (DSPU) in addition to or instead of the ALU 224. The processor 220 may include one or more registers 226 communicatively coupled to the core 222. The registers 226 may be implemented using dedicated logic gate circuits (e.g., flip-flops) and/or any memory technology. In some examples, the registers 226 may be implemented using static memory. The register may provide data, instructions and addresses to the core 222. In some examples, processor 220 may include one or more levels of cache memory 228 communicatively coupled to the core 222. The cache memory 228 may provide computer-readable instructions to the core 222 for execution. The cache memory 228 may provide data for processing by the core 222. In some examples, the computer-readable instructions may have been provided to the cache memory 228 by a local memory, for example, local memory 230 attached to the bus 248. The cache memory 228 may be implemented with any suitable cache memory type, for example, metal-oxide semiconductor (MOS) memory such as static random access memory (SRAM), dynamic random access memory (DRAM), and/or any other suitable memory technology. The processor 220 may include a controller 229, which may control input to one or more processors included herein, e.g., processor 210. Controller 229 may control the data paths in the ALU 224, the FPLU and/or DSPU, if included. Controller 229 may be implemented as one or more state machines, data paths and/or dedicated control logic. The gates of controller 229 may be implemented as standalone gates, FPGA, ASIC or any other suitable technology. The registers 226 and the cache memory 228 may communicate with controller 229 and core 222 via internal connections, which may be implemented as a bus, multiplexor, crossbar switch, and/or any other suitable connection technology.

Inputs and outputs for the processor 220 may be provided via the bus 248, which may include one or more conductive lines. The bus 248 may be communicatively coupled to one or more components of processor 220, for example the controller 229, cache 228, and/or register 226. The bus 248 may be coupled to one or more external components of the system 100. The bus 248 may be coupled to one or more external memories 230. The external memories 230 may include Read Only Memory (ROM), which may be implemented by a masked ROM, Electronically Programmable Read Only Memory (EPROM) or any other suitable technology. The external memory 230 may include Random Access Memory (RAM), which may be implemented by a static RAM, battery backed up static RAM, Dynamic RAM (DRAM) or any other suitable technology. The external memory 230 may include Electrically Erasable Programmable Read Only Memory (EEPROM), Flash memory, one or more magnetic storage devices such as a disc drive, and/or one or more solid state drives.

The memory 230 may store processor-executable instructions 232, which may control the operation of the system 101 (e.g., of the power storage unit 114). The instructions 232 may provide the operating system for the power storage unit 114 or for the other elements of the power management system 101 such as the battery 114, power conversion device 115, or the inverter 116. The operating system may be organized into at least two layers including a first (or top) layer 234 and a second (or bottom) layer 236. The top layer 234 provides user applications and communications functions and may be referred to as the applications layer 234, while the bottom layer 236 provides communications with the system's 200 hardware and may thus be referred to as the hardware layer 236. In some embodiments, the top layer 234 configures the controller 210 to function as a server (e.g., by sharing data, performing computational functions and/or providing connectivity) to one or more client devices (e.g., computing device 109). As such the controller 210 may also be referred to herein as a server 210. In some embodiments, the operating system may include additional layers between the top 234 and bottom layers 236.

The system 200 further includes a client (or user) device 250, which may be or implement in part the client device 109 in FIG. 1. The user device 250 can be any computing device, such as a tablet, laptop, smartphone, personal computer or others. The user device 250 includes at least a processor 252, a memory 254, a display 260, and communications interface 256 which are electrically or communicatively connected by a user device bus 258. The communications interface 256 may use any suitable communication technology (e.g., wired or wireless communication technologies such as WiFi, cellular, Low Power WAN, Bluetooth, Zigbee or others) to communicatively connect the user device bus 258 to the server bus 248 (i.e. via the server's respective communications interface 246). Like the processor 220, the processor 252 of the user device 250 may be any suitable processor type and may have similar components to those of processor 220. The processor 252 may be further configured as a graphics processor programmed to generate displays for the graphical user interfaces 270 described herein. Similarly, the memory 254 may be implemented by any suitable combination of non-volatile memories, such as ROM, EPROM, EEPROM, RAM, Flash, disc or solid state drives.

The memory 254 may include executable instructions 255 which control various operations of the user device 250, for example instructions which program the processor 252 to execute a power management application that provides the various display 260 screens (e.g. interface screens 272 and 274) associated with the graphical user interface 270 described further below. The display 260 may be implemented using any suitable display hardware technology (e.g., Liquid Crystal Displays (LCD), Light Emitting Diodes (LCD) Displays, Organic Light Emitting Diodes (OLED) Displays, Plasma Displays, Quantum-Light Emitting Diodes (QLED) Displays, Field Emission Displays (FED), Digital Light Processing (DLP) Displays, etc.). In some embodiments, the display 260 is a touch-sensitive display (or touch screen) enabling the user to interact with the graphical user interface (GUI) 270 via touch rather than via peripheral device such as a mouse. However, it is envisioned that in some embodiments, user interactions with the GUI 270 may be on conventional (non-touch) display technologies. Also, one advantage of some embodiments of the present disclosure is the ability to provide real-time, sometimes on-the-go or in the field, information about the performance of the power management system 101. In such instances, the GUI 270 may be provided on a portable (i.e. hand-held) computing device 250 such as a tablet or smartphone. Aspects of the graphical user interface 270 described according to some embodiments are specifically designed with this in mind in order to provide an intuitive and user-friendly interface even on portable/hand-held device screens 260. When executed, the power management application (e.g. stored in memory in the form of instructions 255) generates and provides the GUI 270, which is presented on the display 260 of the user (or client) device 250. The power management application's GUI 270 may include a plurality of interface screens that provide various information and/or controls to the user. The GUI 270 may provide a single user interface that aggregates the system 101 information into a single visual element easily understood by the user. The single visual element may provide a variety of relevant information pertaining the performance, connection status, or other characteristics of the system. For example, the GUI 270 may include a first interface screen 272, also referred to as the Power Flow screen 272, and a second interface screen 274, also referred to as the Home screen 274, details of which are provided further below. In some embodiments, execution of the power management application may provide only one of those screens. In some embodiments, additional interface screens may be provided. For example, a Settings screen, a System START/STOP screen, a Historical Data (or Statistics) screen, or other screens may provide additional information and/or user controls for controlling the system 101.

Figure 3:
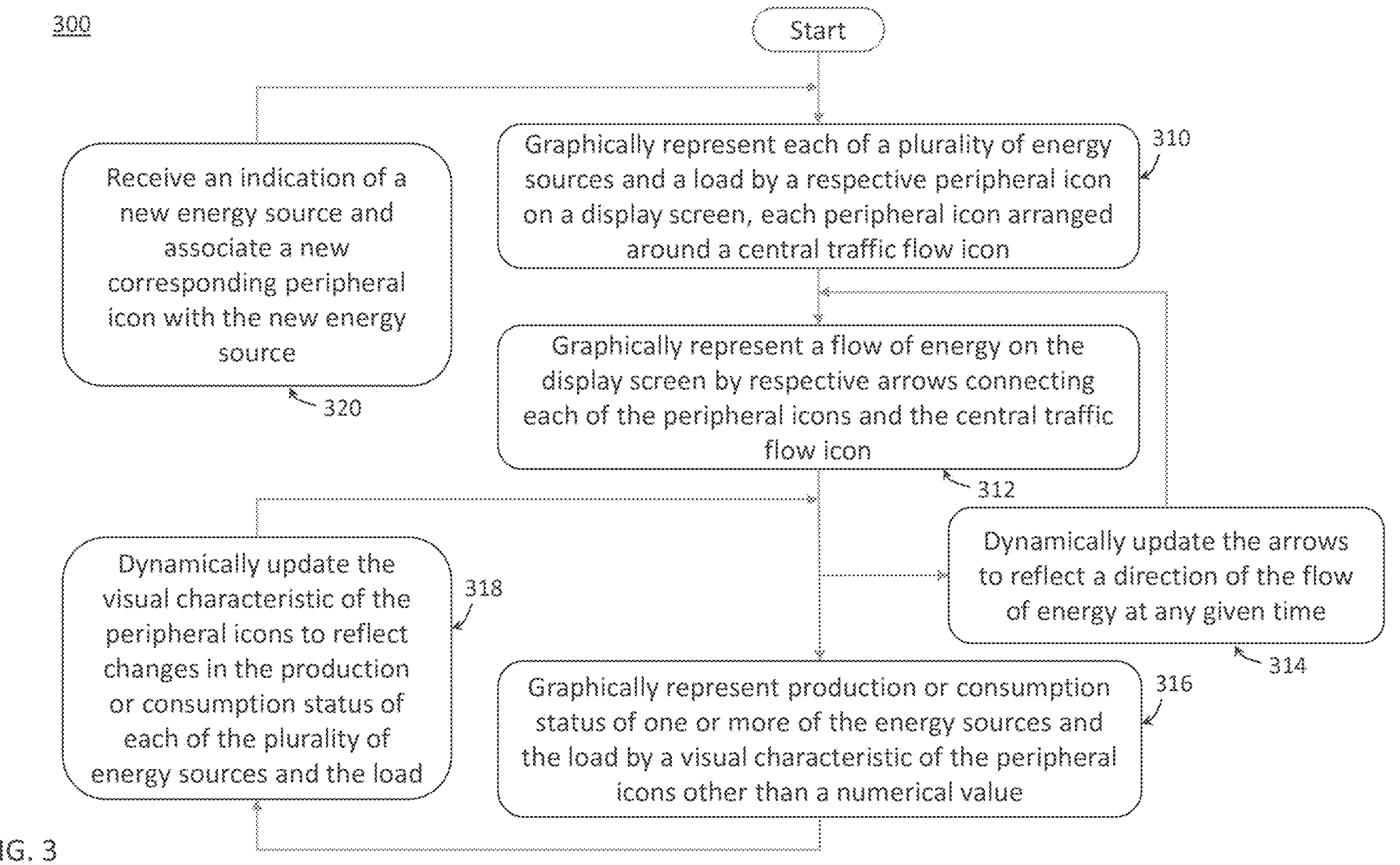
FIG. 3 shows a flow diagram of a process associated with the user interface of the power management system according to the present disclosure.

FIG. 3 shows a flow diagram of a process 300 associated with a graphical user interface 270 provided when executing the power management application according to the present disclosure. Process 300 in FIG. 3 is associated with the Power Flow screen 272 of the GUI 270, which will be described further with reference to the example screen shots 401-412 of Power Flow screens 272 shown in FIGS. 4A-4L. At the start of the process 300, and as shown in block 310, each power source and the load 110 are graphically represented, on a display screen (e.g., display 260), by a respective peripheral icon 420 (see e.g., FIG. 4A). The peripheral icons 420 are arranged around a central icon 430, also referred to as the traffic flow icon 430.

Figure 4B:
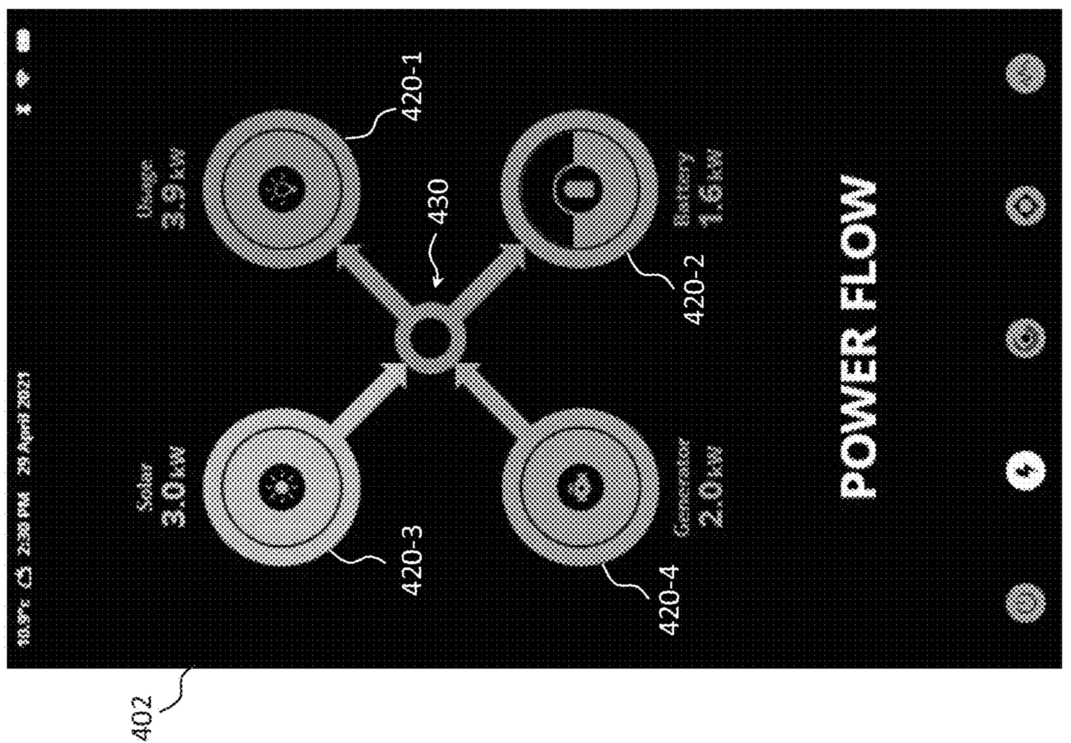
FIGS. 4A-4L shows various examples of a display screen of the graphical user interface according to the present disclosure.
Figure 4A:
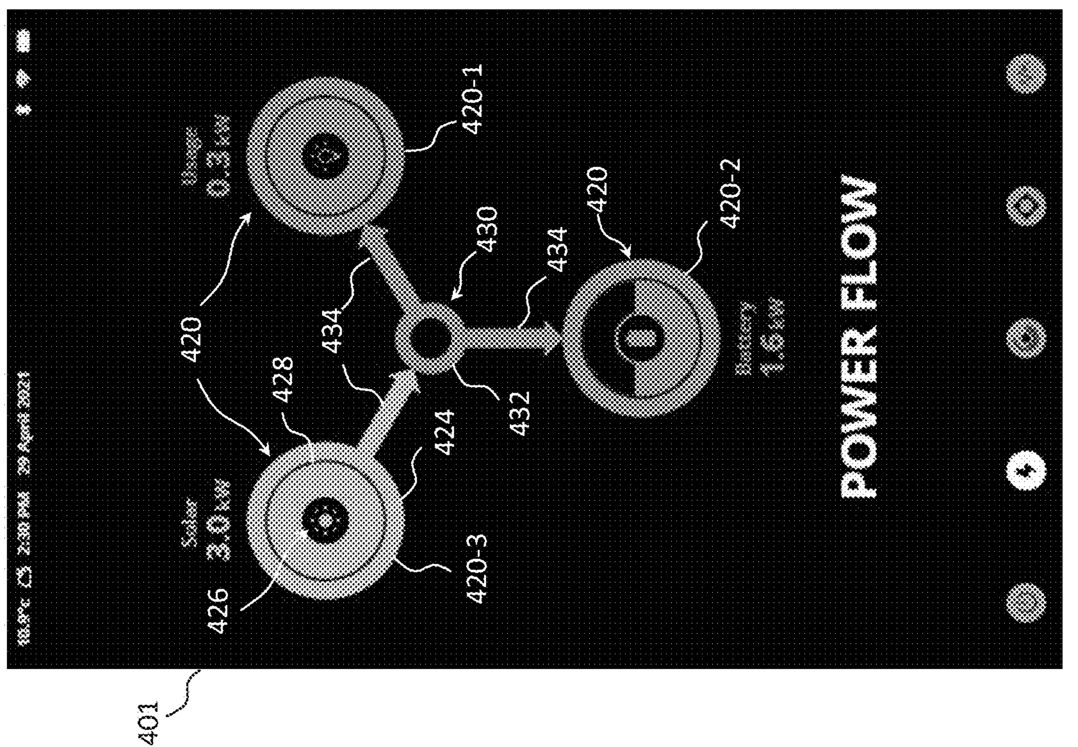

Referring to screen shot 401 in FIG. 4A for example, in its simplest form, the power flow screen 272 of a graphical user interface 270 of the power management application may show a set of peripheral icons 420 arranged around a traffic flow icon 430 located generally at the center of the peripheral icons 420. The peripheral icons 420 may represent the source and, or sink components (or resources) of the local power system 100. The traffic flow icon 430, in effect may represent the electrical connections of the components, e.g. one or both of the communication bus 202 or the power bus 204, with the control panel (e.g. the combination of the communication 202 and power interconnections 204 with the controller 210 of the system 100). The peripheral icons 420 of a given Power Flow screen 272 may thus represent either the load 110, the battery 114, or the individual power sources (e.g., solar 122, wind 124, hydro 126, generator 105, fuel cell 107, or the grid 102) communicatively connected to the controller of the power management system 101 (e.g., controller 210 of system 200). In the GUI 270, each power source that is electrically connected to the system's controller 210 may be represented in the Power Flow screen 272, by a peripheral icon 420, in this case shown as circular icon or graphic. Each of the peripheral (e.g., circular) icon 420 may have unique graphical elements, such as a unique central graphic 426. The unique central graphic 426 may provide a different pictorial or symbolic representation of the corresponding source or load 110, and/or a unique color. Some or all of the peripheral (e.g., circular) icons 420 may have dynamic elements which provide real-time information (e.g., status information) about the associated power source, battery 114, or the load 110, as will be described further below. For example, and with reference to the solar icon 420-3 in FIG. 4A, each peripheral icon 420 may include an outer circle or ring 424 that encircles an inner graphic 426, which is pictorial or symbolic representation of the power component with which the given icon 426 is associated. Each peripheral icon 420 may also include an intermediate (or variable-fill) area 428 which extends between the inner graphic 426 and the outer ring 424. This intermediate (or variable-fill) area 428 in the present example is generally annular (or ring-shaped) and may thus also be referred to as inner ring 428. The inner ring 428 of one or more of the peripheral icons 420 may be a dynamic component of the icon 420 whereby a status of the power component (e.g., the consumption level or status of the load 110 or the production/output level or status of a power source) is visually represented by the amount of fill of the inner ring or graphic 428.

As illustrated in the screen shots 401-412, each of the peripheral icons 420 may represent a power component of the system 100, for example the load 110, the battery 114, and the one or more power sources that are part of the local power system 100, such as any combination of off-grid power sources (e.g., renewable sources 106 such as solar 122, wind 124, hydro 126, and/or non-renewable sources 104 such as a generator 105, a fuel cell 107, or others) and/or grid power 102. In a three component scenario shown in the example in FIG. 4A, the load 110 may be represented by a corresponding peripheral icon 420-1 (also referred to as load or usage icon 420-1), the battery 114 may be represented by another corresponding peripheral icon 420-2 (also referred to as battery icon 420-2), and an example off-grid power source, in this case solar 122, may be represented by yet another corresponding peripheral icon 420-3 (also referred to as solar icon 420-3). The central traffic flow icon 430 may be represented by any suitable graphic, for example a circle 432 displayed generally at the center of the peripheral icons 420. Aesthetically, using a circle 432 to represent the traffic flow icon 430 may be visually appealing to, and easy to understand by, a user as resembling a traffic circle (or round-about). However, in other embodiments, a different, non-circular graphic may be used to represent the traffic flow icon 430, which in effect graphically represents the controller 210 on the display 260. The traffic flow icon 430 (e.g., circle 432) in this example has a smaller footprint (e.g., diameter) than the peripheral icons 420, which may improve aesthetics and/or may conserve space on the display 260 to enable adding a greater number of additional peripheral icons 420 as new power sources are connected to the system 100. The peripheral icons 420 may be substantially equally spaced from the traffic flow icon 430 (e.g., the circle 432). The peripheral icons 420 may additionally or optionally be substantially equally spaced from one another. For example, the peripheral icons 420 may be arranged in an array around the traffic flow icon 430 such that they appear to be at a substantially equal spacing around the circle 432 and, or equally spaced from each other peripheral icon 420 in a ring about the traffic flow icon 430.

With reference to FIG. 4B, as new power components are electrically connected to the power management system 101 (e.g., to controller 210), the graphical representation 270 of the local power system 100 (as represented in the Power Flow screen 272) may dynamically update to add corresponding additional peripheral icons 420 to the Power Flow screen 272. The equal spacing (e.g., distance from the circle 432 and/or spacing between peripheral icons 420) may be maintained as the display 260 is updated to include additional peripheral icons 420, as can be seen e.g., from the screen shots 401, 402, and 404 shown in FIGS. 4A, 4B, and 4D, respectively. Referring back to block 320 of the process 300, the system 100 (e.g., controller 210 may receive an indication (e.g., as reported to the register 226) that a new energy source has been connected to the system 100, and the graphical user interface (e.g., Power Flow screen 272) may be updated to include a new corresponding peripheral icon 420 associated with the newly added power source. A result of this can be seen e.g., in FIG. 4B, where an additional off-grid power source, here a generator 105, has now been electrically coupled to the system 100 (e.g., to controller 210) and thus a corresponding peripheral icon 420-4 (also referred to as generator icon 420-4) has been added to the Power Flow screen 272 as shown in the screen shot 402 in FIG. 4B. The use case scenarios in screen shots 401 and 402 may represent off-grid use cases, such as when power may need to be provide to an off-grid home, off-grid maritime application, or off-grid field applications such as for disaster relief or the military or other field or temporary or use scenarios where grid power 102 may not be readily accessible.

Figure 4D:
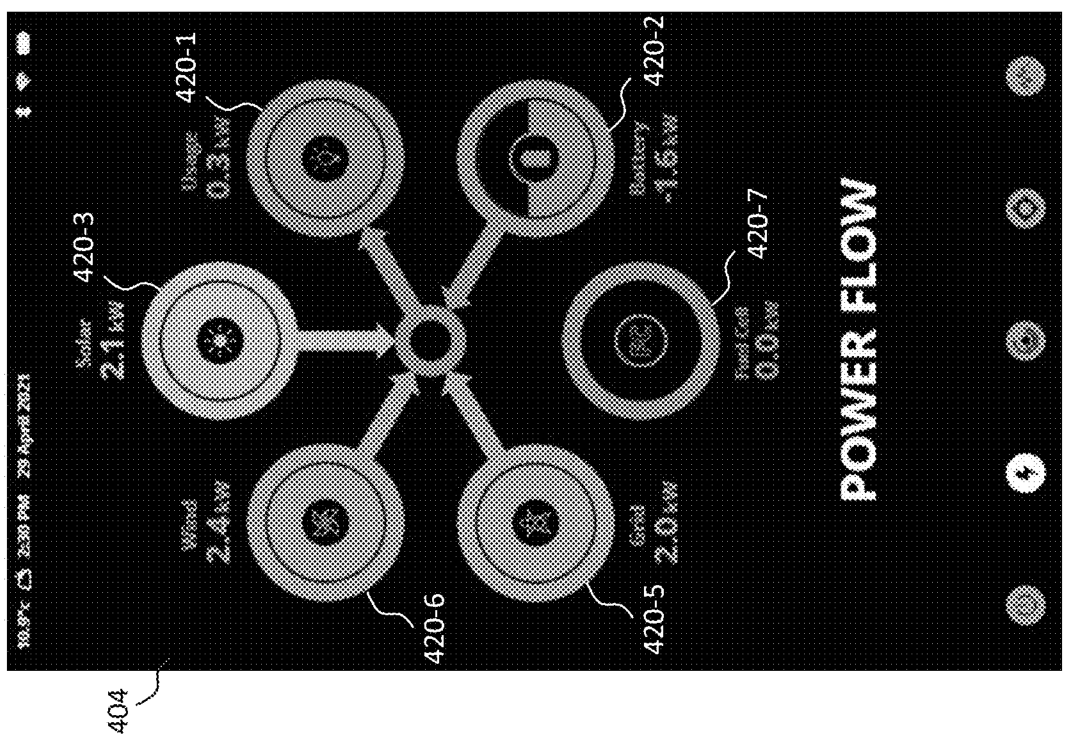
Figure 4C:
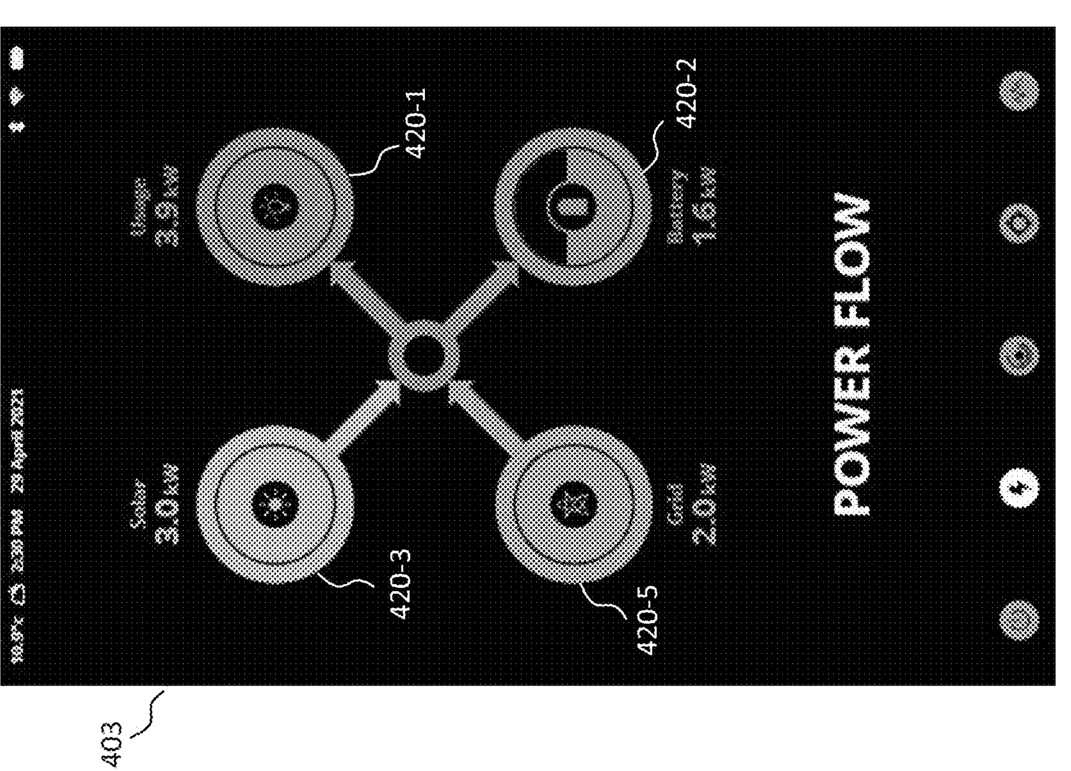
Figure 4G:
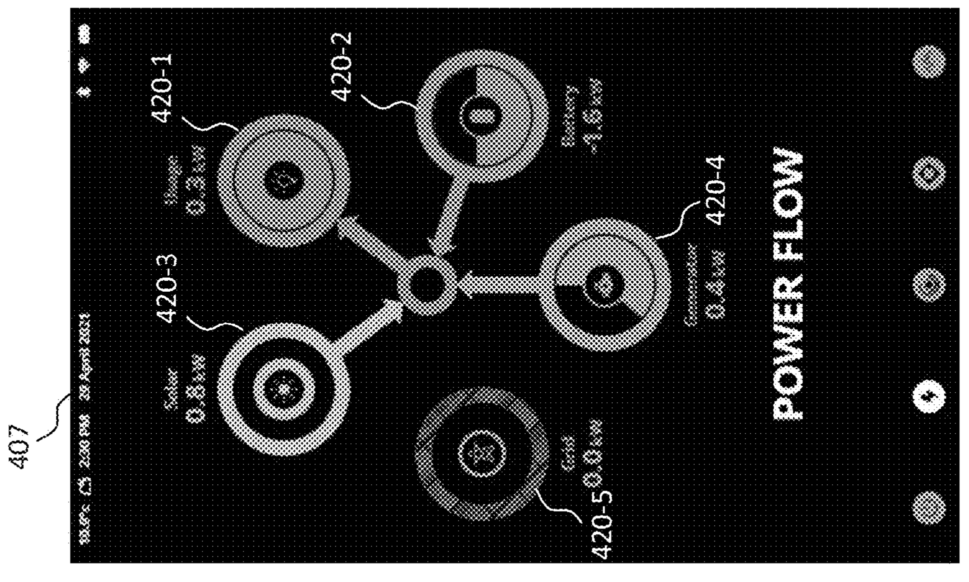
Figure 4G:
Figure 4F:
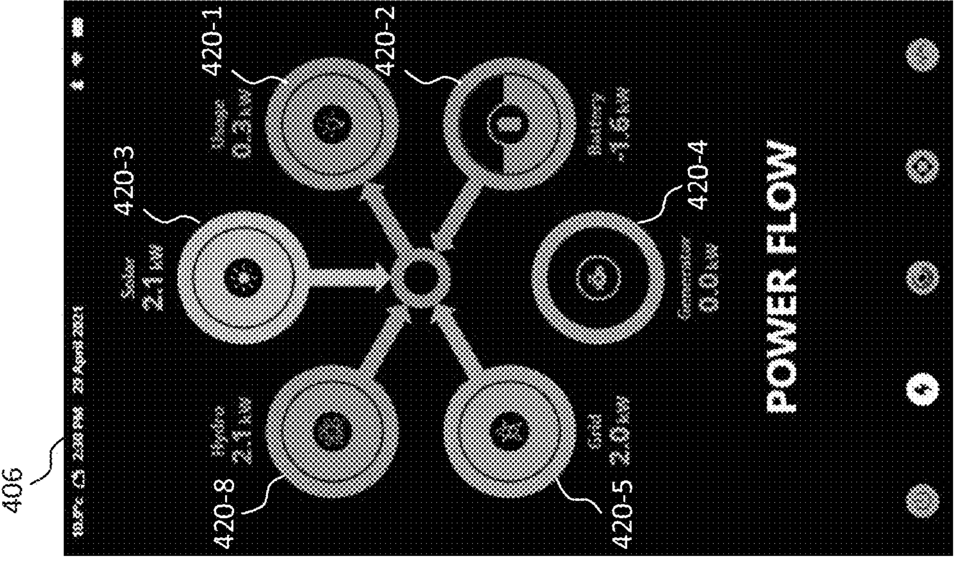
Figure 4E:
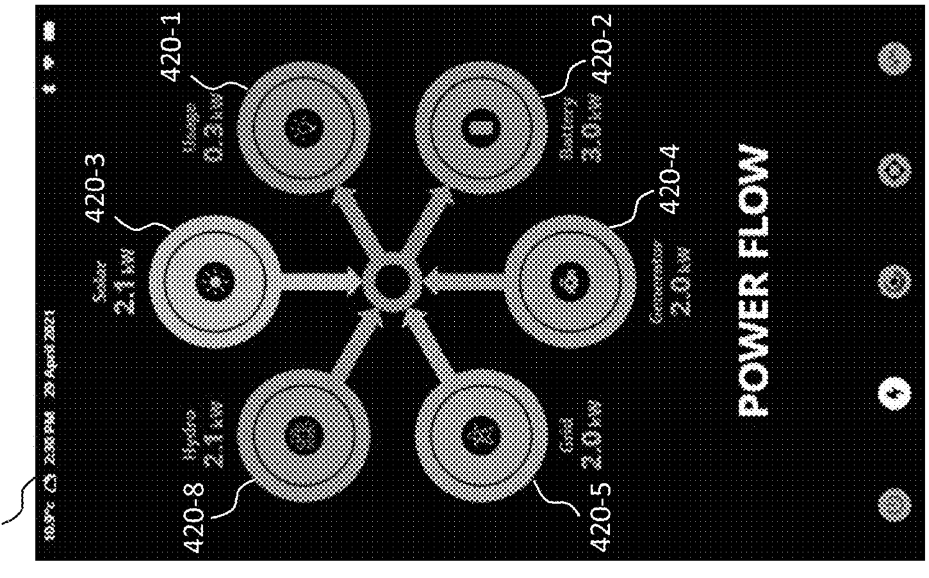
Figure 4J:
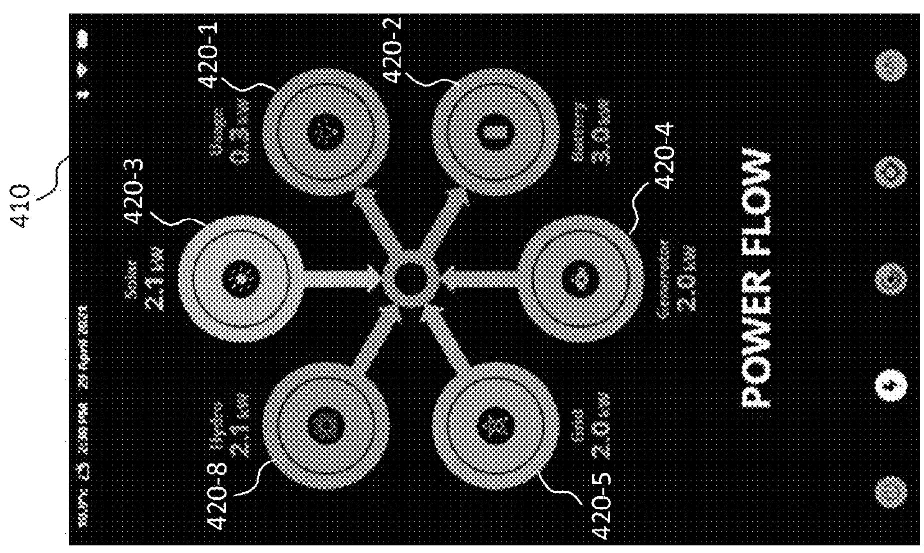
Figure 4I:
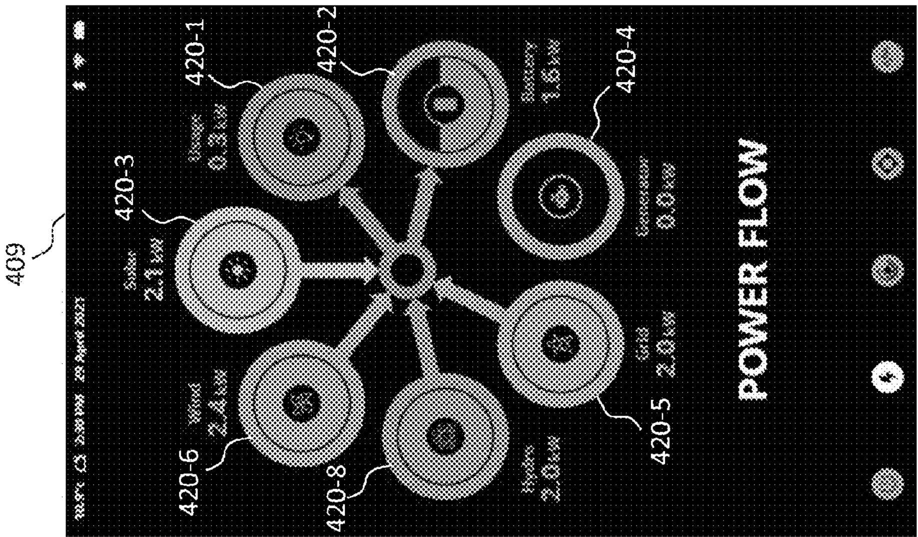
Figure 4H:
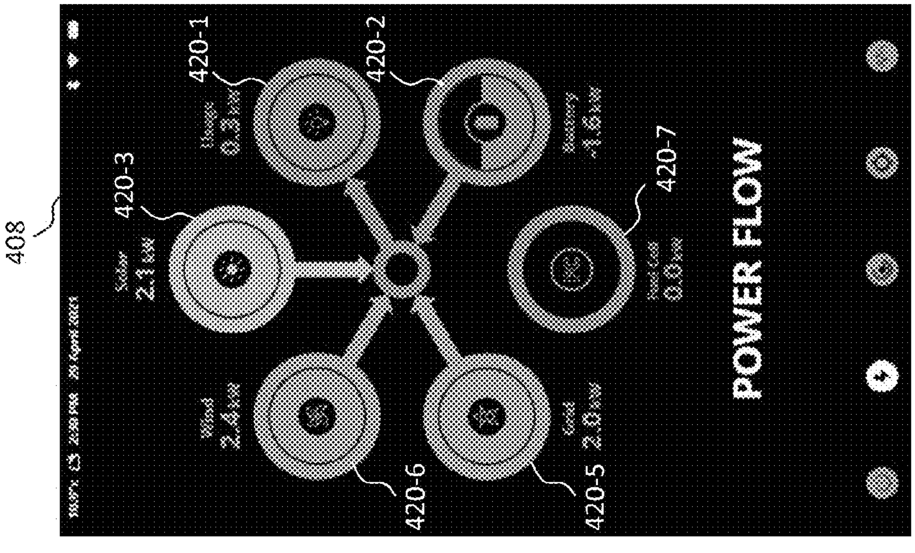

Additional examples of the dynamic updating of the Power Flow screen 272 may be shown in FIG. 4C, 4D, or 4E e.g., in the screen shots 403-405. For example, in the screen shot 403 in FIG. 4C, in addition to the load icon 420-1, battery icon 420-2, solar icon 420-3, and a grid power source 102 has been electrically coupled to the power management system 101 (e.g., to controller 210) and thus a corresponding peripheral icon 420-5 (also referred to as grid icon 420-5) has been added to the Power Flow screen 272 of FIG. 4A. In the screen shot 404 in FIG. 4D, in addition to the load icon 420-1, a battery icon 420-2, a solar icon 420-3, and a grid icon 420-5 of FIG. 4C, a wind power source 124 and a fuel cell 107 have been communicatively coupled to the power management system 101 (e.g., reported to controller 210) and thus corresponding peripheral icons 420-6 and 420-7 (also referred to respectively as wind icon 420-6 and fuel cell icon 420-7) have been added. In the screen shot 405 in FIG. 4E, in addition to the load icon 420-1, battery icon 420-2, solar icon 420-3, and grid icon 420-5 of FIG. 4C, a hydro power source 126 and a generator 105 have been electrically coupled to the power management system 101 (e.g., reported to controller 210) and thus corresponding peripheral icon 420-8 (also referred to as hydro icon 420-8) and generator icon 420-4 have been added.

As each additional icon 420 is added to the Power Flow screen 272, the peripheral icons 420 may adjust positions relative to the traffic flow icon 430. For example, as shown in FIGS. 4C and 4D, the solar icon 420-3 may move from a top-left position to a top-center position. A preferred position or arrangement of icons 420 may be optionally set by a user or determined by the system 101. Conversely to adding new peripheral icons 420, if a power component of the local power system 100 is deregistered (e.g., removed from the registry 226 of the power management system 101), the corresponding peripheral icon 220 associated with that power component may be removed from the Power Flow screen 272. As previously noted, each peripheral icon 220 that is associated with a different type of power component may be uniquely colored. For example, the solar icon 420-3 may be colored yellow, the wind icon 420-6 may be colored blue, and the hydro icon 420-8 may be colored cyan, the usage icon 420-1 may be colored orange, the battery 420-2 may be pink, the generator icon 420-4 may be brown or similar color, or the grid icon 420-5 may be gray. A different unique color coding may be used in other examples. The unique color coding may be applied to each peripheral icon 420, its associated arrow 434, and optionally to the informational overlays 501-504 (e.g., in FIGS. 5A-5D) and/or any coloring associated with visual representation of statistical data associated with each power source (e.g., the bars in the bar chart in FIG. 9).

Referring back to FIG. 3, the graphical user interface 270, specifically the Power Flow 272 screen may be configured to graphically represent the flow of power, energy, and or data between components by respective arrows 434 (see e.g., FIG. 4A) connecting each of the peripheral icons 420 and the central traffic flow icon 430, as shown in block 312 of process 300. As such, the Power Flow screen 272, which in some embodiments provides a graphical representation 270 of what is occurring physically on the direct current (DC) bus of the power storage unit 114, may further include a graphical representation 270 of the direction of energy flow, thereby providing a user-friendly visualization of the components of the systems 100 and whether they are acting as energy source(s) or energy sink(s) at any given time. As further shown in block 314 of FIG. 3, the graphical representation 270 provided via the Power Flow screen 272 is dynamically updated to reflect any changes in the flow of energy, such as by changing the direction of the arrow 434 between the peripheral icon 420-2 and the traffic flow icon 430 to reflect when the battery 114 is acting as a source (i.e. provide energy to the load 110) or a sink (receives energy from the bus) at various times. For example, as shown in FIGS. 4A-4L, power sources that provide a net input of energy to the system 100 may be represented by their respective arrows 434 extending from the outer circle 424 of the icon 420 towards the traffic flow icon 430 but not merge with the traffic flow icon 430. For components that receive a net output from the system 100, such as the load icon 420-1, their respective arrows 434 may extend from the traffic flow icon 430 to the outer circle 424, but not merge with the circle 424. When a component changes from a net input to a net output, or the opposite, the arrows 434 of the user interface 270 may dynamically update the orientation of the arrows 434, as may be shown from screen shot 405 to screen shot 406. Further, the traffic flow icon 430 may have a color corresponding to one or more of the components receiving a net output, for example the orange of the load icon 420-1. The color of the traffic flow icon 430 may be determined by user preference or by historical data, such as largest historical receiver of power. When two or more components receive a net output, the traffic flow icon 430 may include one or multiple colors. For example, as shown in FIG. 4E, the color of the arrows 434 extending from the traffic flow icon 430 may blend or merge from a first color, orange for usage in FIG. 4E, to a second color, pink, representing the battery 420-2 also receiving electrical power.

Referring now also to FIGS. 4A-4J, for example, the load 110, represented by the load or usage icon 420-1, may always acts as an energy sink and thus the arrow 430 from the traffic flow icon 430 to the usage icon 420-1 may always point towards the usage icon 420-1. The off-grid power source(s) may always act as an energy source and thus the arrows 434 connecting any peripheral icons 420 associated with off-grid power sources (e.g., the solar icon 420-3, the generator icon 420-4, the wind icon 420-6, the fuel cell icon 420-7 and the hydro icon 420-8) may always point towards the traffic flow icon 430, e.g., as seen in FIGS. 4A-4J. In the illustrated examples, grid power 102 is similarly shown as acting as a power source and thus the arrow 434 points from the grid icon 420-5 towards the traffic flow icon 430 in all of the example screen shots in FIGS. 4A-4J. However, it will be understood that in some cases it may be advantageous to enable a user to provide its excess power to the grid 102, for example when power output from the various off-grid sources exceeds usage the available storage capacity, and/or when it is more beneficial to feed the energy to the grid than to store locally, and in such scenarios, the grid 102 may periodically function, and thus be indicated, as a sink (i.e. receiving power) in the Power Flow screen 272 by reversing the direction of the arrow 434 to point from the traffic flow icon 430 towards the grid icon 420-5. The battery 114, which is represented by battery icon 420-2, may intermittently (e.g., during a 24-hour period) act as a power source or a power sink. At times, the battery 114 may act as a sink, such as when it is being charged, and thus the arrow 434 between the battery icon 420-2 and the traffic flow icon 430 may point towards the battery icon 420-2 during times when energy is flowing towards the battery 114 (i.e. during charging). Conversely, when power is drawn from the battery 114, the battery 114 acts as a source and during such times, the arrow 434 may point toward the traffic flow icon 430.

At times, energy may not be flowing to or from one or more the power components, e.g. in a Standby mode, and thus at such times, the arrow 434 between a given component (e.g., icon 420-7 in FIGS. 4D and 4H, icon 420-4 in FIGS. 4F and 4I, icon 420-5 in FIG. 4G, and all peripheral icons in FIG. 4K) and, or the traffic flow icon 430 may be removed. Additionally, the peripheral icons 420 may include labels indicating a name of the power source or a numerical indication of the power flow into or from the component. For example, a current power total in kilowatts (kW) may be shown adjacent the peripheral icons 420. For devices that commonly alternate between a net power input or power output, a negative symbol (−) may indicate one of the two flow directions. For example, as shown in FIGS. 4C and 4D, when the battery 114 receives a net amount of power the numerical indication adjacent the battery icon 420-2 may be positive or lack the negative symbol, and when the battery 114 provides a net output of power the numerical indication adjacent the battery icon 420-2 may be negative indicating a net loss of power from the battery 114.

Figure 4L:
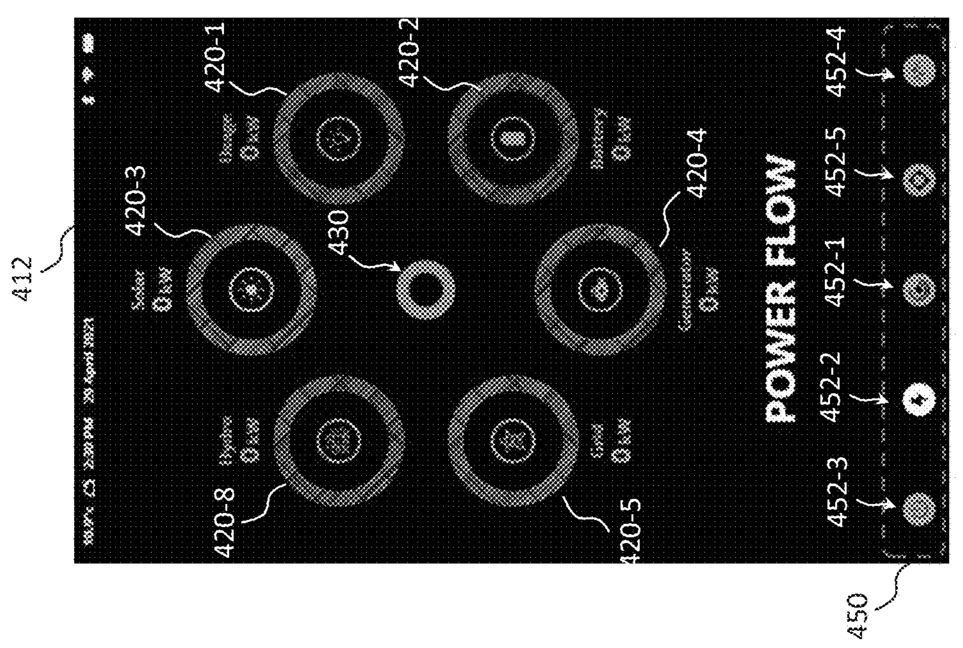

As can be seen in the various screen shots of the Power Flow screen 272, for any power source electrically coupled to the controller 210, but which is not presently providing energy to the system 100, the arrow 434 between its corresponding peripheral icon 420 and the traffic control icon 430 may be removed, at least temporarily, from the display 260 or graphical user interface 270. When energy flow resumes with respect to that power component, the arrow 434 that connects the corresponding peripheral icon 420 and the traffic control icon 430 may be added back to the display 260. As such, the display 260 may provide a dynamic and easy to visualize representation of the energy flowing between the various components of the system 100. Referring to FIG. 4L and also to FIG. 4G, at times previously registered components of the system 100 may become temporarily unavailable which may include a grid outage of the grid 102 or the failure of any of the power sources 106 or 104, such as a defective generator 105, a failure of the inverter 117 for the load 110, a failure of some or all of the battery 114, of loss of communication or data transmission with the controller 210 of any of the sources and sinks represented by the peripheral icons 420. In such instances, the icon 420 corresponding to the component(s) that is not presently available (e.g., due to failure or outage of that power source) may be grayed out, dimmed, hatched over, or otherwise visually de-emphasized on the display, as may be shown by the grid icon 420-5 in FIG. 4G. The associated arrows 434 may also be removed indicating no power or information is flowing to or from that component. As such, whenever the controller 210 receives a fail signal from any of the components associated with peripheral icons 420, that peripheral icon 420 is visually de-emphasized (e.g., grayed out) on the display 260, to indicate that the corresponding resource is not available.

Figure 4K:
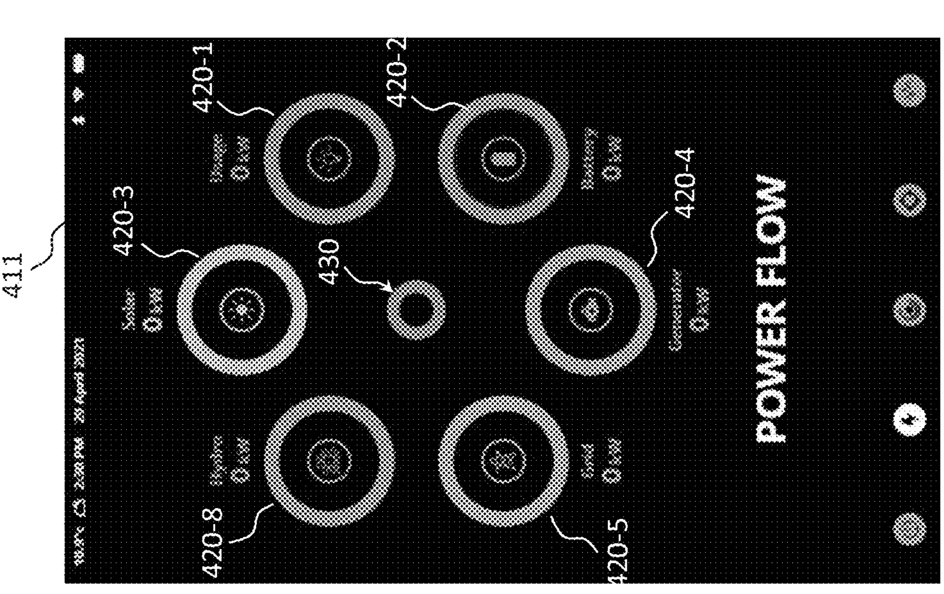

As is further shown at block 316 in FIG. 3, another feature of the Power Flow screen 272 may be that it represents production or consumption status of each of the plurality of energy sources and the load 110, respectively, by a visual characteristic of the peripheral icons 420 other than a numerical value. This visual characteristic may dynamically update to reflect changes in production or consumption as shown in block 318, and thus represent the current status of the corresponding element of the system 100 at any given time. For example, referring to the solar icon 420-3, the fill amount of the intermediate area 428 between the outer ring 424 and the inner graphic 426 of the usage icon 420 may dynamically vary based upon consumption of energy by the load 110. The fill amount of the intermediate area 428 between the outer ring 424 and the inner graphic 426 of the battery icon 420-2 may also be configured to dynamically vary to reflect the current charge level of the battery 114. One or more of the peripheral icons 420 in the Power Flow screen 272 may not have a dynamic intermediate (or fill) area 428. For example, the grid icon 420-5 may be substantially static in this regard and thus when grid power 102 is connected to the provide power to the load 110, the intermediate (or fill) area 428 may be substantially fully filled in to indicate the flow of power from the grid 102. When grid power 102 is not available in a typical grid-connected use case scenario, the non-availability of power from the grid 102 may be indicated by the absence of an arrow 434 from the grid icon 420-5 to the traffic flow icon 430 e.g., as shown in FIG. 4K. In the case of any of the off-grid power sources, the fill amount of the intermediate area 428 between the outer ring 424 and the inner graphic 426 of the corresponding (e.g., solar 122, wind 124, hydro 126, generator 105, or fuel cell 107) icon 420 may be configured to dynamically vary based upon power output of the corresponding power source.

The manner in which the fill level 428 is adjusted or visually displayed to reflect the current status of that power component may differ for one or more of the different types of elements of the system 100. For example, the intermediate (or fill) area 428 of a renewable energy source 106, such as solar 122 of icon 420-3 may be filled from the center 426 outward, which may give the visual impression of sun's rays travelling outward from the center 426. In other words, the fill level of the generally ring-shaped intermediate (or fill) area 428 of the solar icon 420-3 may increase radially outward, by increasing the thickness of the inner ring 428, to reflect greater output of the solar array 122. Conversely, the fill level 428 may decreases radially inward, by decreasing the thickness of the ring 428, to reflect reduced output of the array 122. This effect may be illustrated for example in FIG. 4F which shows the solar array 122 at full output and thus the inner ring 428 of the solar icon 420-3 as fully filled in, as compared to FIG. 4G which shows the solar array 122 at a partial output and thus the inner ring 428 of the solar icon 420-3 only partially filled.

Different suitable formulas may be used to represent the current status, e.g., current percentage (%) output of the array 122 or other renewable energy generation source 106. For example, the filled ring-shaped 428 (or annular) area may vary based on the percentage (%) output, rather than a total output or varying the size (or diameter) of the inner ring 428. In other examples, the status metric may be correlated to the size of the filled portion of the ring 428, such as the diameter or area of the filled portion 428. A similar technique of adjusting the fill level radially outward/inward may be used for any of the other renewable energy source 106 (e.g., solar 122, wind 124, hydro 126, etc.) icons 420, and/or the usage icon 420-1. Alternatively, or additionally, at least one of the off-grid source icons, for example the generator icon 420-4 may be updated to give a visual impression of a speedometer. In other words, the fill level of the intermediate (or fill) area 428 of the generator icon 420-4, for example, may be filled or emptied in a clockwise/counterclockwise fashion, respectively. The fill area 428 may simulate how a gauge on a speedometer increases to indicate higher rotations per minute (RPM) or higher speeds. Such a representation may commonly be used to represent the current power output as compared to maximum output of the generator 105. The fuel cell icon 420-7 may be similarly dynamically updated to show the current output of a fuel cell 107. In some embodiments, this same technique may also be used to represent the charge level of the battery 114. In the case of the battery, the portion of the annular fill area 428 that is colored (or filled) may indicate the current battery charge. The fill area 428 may vary (increases or decreases angularly, in a clockwise/counterclockwise manner) as the battery 114 is further charged or depleted. In some embodiments, as illustrated for example in FIGS. 4E and 4F, the fill level 428 of the battery icon 114 may be adjusted vertically, e.g. having a horizontal border between the filled and unfilled are of the inner ring 428, which may give the visual impression of filling or emptying of a liquid volume in container. While a similar technique (e.g., radially outward, vertically, or angularly) may be used to adjust the fill area 428, the fill level as related to corresponding power consumption or output, or the energy content in the case of the battery 114, may be computed differently to provide a most user-friendly and/or aesthetically pleasing appearance.

In some cases, the power output, or other metric communicating statuses of the energy source, may be normalized (e.g., to 100% or as the maximum output) in order to more effectively display the status information visually. Sometimes, the current status information (e.g., current usage in the case of the usage icon 420-1) may be normalized differently for example in relation to historical usage data, which can provide a more user-friendly (easy to understand) visual representation of current usage. Some power sources may consistently operate at less than 100% of a maximum output and a normalized metric may be represented as similar to or as the 100% level. A normalized metric may also be used when a power source consistently operates at a lower output level consistently for certain days or during certain times of day and at a higher output level consistently at other times. A typical household's usage of electricity, for example, is usually well below median during most parts of the day. However, when certain high-wattage appliances (e.g., refrigerator, air-conditioner, washer/dryer) are turned on, the power consumption increases dramatically over typical usage. Therefore, if non-normalized usage was presented visually, the scaling of the dynamic component to actual usage (e.g., in Watts) makes it difficult to present meaningful information visually. Thus, for some power sources it may be more useful to display an average or consistently operated output level, or other relevant metric, as the normalized metric and show a displayed percentage as the ratio of the normalized metric. In one embodiment, the usage icon 420 is therefore dynamically updated to show the load percentile based on load statistics for a given user (e.g., a given household). For example, for a power source that consistently provides or averages an output at 20% of the actual maximum output, the 20% output may be indicated as a completely filled intermediate fill area 428, and a lower output percentages displayed as ratios of the 20% level. For other power sources, such as grid power 102, a maximum output may not be a useful or readily quantifiable metric. For those power sources, the maximum output or percentage output may be replaced with a historic average or a historic maximum output. In other embodiments, various other suitable statistical methods may be used to correlate the current usage to the dynamically varying fill area 428 of the usage icon 420.

Figure 5D:
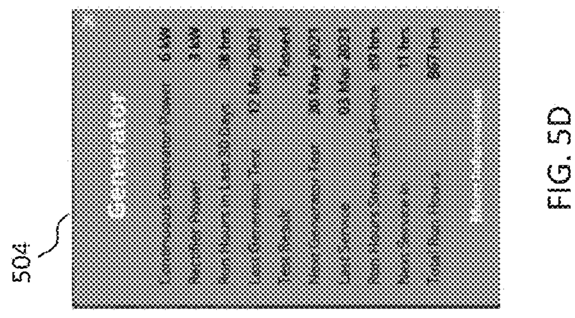
FIGS. 5A-5D show various examples of informational overlays associated with the display screens in FIGS. 4A-4L.
Figure 5C:
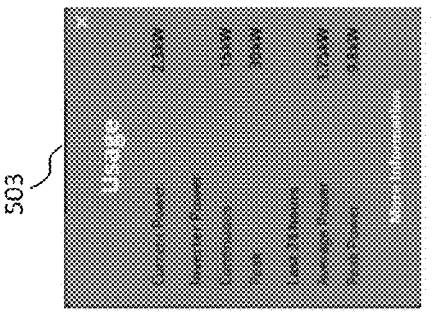
Figure 5B:
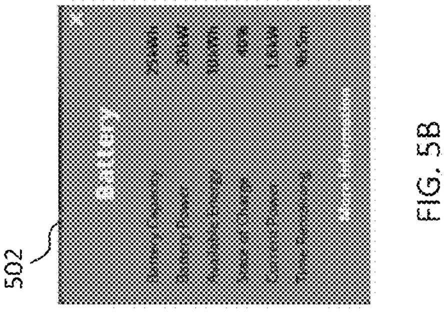
Figure 5A:
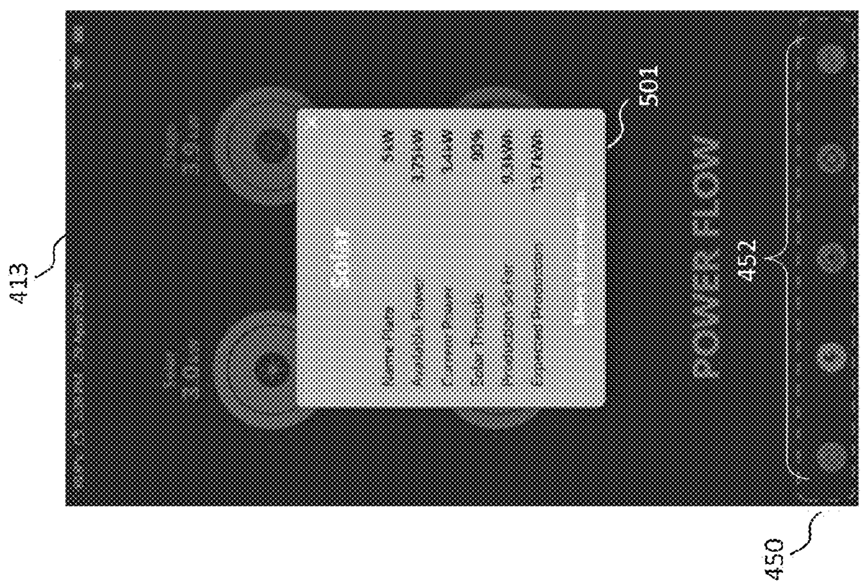

In some embodiments, additional information about a particular power component beyond what is actively displayed and dynamically updated on the Power Flow screen 272 may be provided responsive to a user request. For example, a user may select a given peripheral icon 420 and an information graphic may be overlaid onto the Power Flow display screen 272 as shown e.g., in FIG. 5A. In FIG. 5A, the information graphic 501 in screen shot 413 may be associated with, and displayed responsive to selection of, the solar icon 420-3. Various additional information about the solar power source 124 may be provided such as one or more of the maximum available power output, current power output, throttle setting, total production so far in set period of time (e.g., a 24-hour period), expected production in the set period, etc. The solar information graphic 501 may provide a name plate, which may be either a selected name or a power rating for the array 122, a (currently) available power total, a solar throttle percentage (if solar power is reduced below the available power), a total production over a unit of time, or an expected production over the period of time. Additional examples of informational graphics 502, 503, and 504 for other components of the system 100 are shown in FIGS. 5B-5D which may be displayed in place of the graphic 501 upon selection of the respective icon 420.

For example, the information graphic 502 may provide information about the battery 114 and include a capacity of the battery, the battery power, the available energy in the battery, a state of charge or charge level, a current power input or output, or an estimated time remaining until the battery is charged or depleted. Informational graphic 503 may provide usage or load 110 statistics including a current power usage, inverter power, continuous power, a power peak or maximum, or 24 hour statistics including an average power or a peak power. Informational graphic 504 may provide information about the generator 105 including a continuous generator power or a the total power output during a current period of use, the rectifier power or a maximum power of the rectifier which may add generator power to the system, a total run hours over a period of time, testing information such as a previous test date and test result or a future test date, a date of the most recent service, the total run hours since the last service date, time until the next service or recommended run time until the next service, or lifetime statistics such as a total runtime for the generator.

The graphical user interface 270 may optionally enable the user to control certain features of the power management system 101, such as to control one or more settings of one or more of the power sources, to set and control usage modes, and other functions or settings of the systems. In some embodiments, the graphical user interface 270 may enable the user to easily switch (e.g., toggle by touch selection or swiping) between different screens, for example between the Power Flow screen 272, the Home screen 274, a Settings screen, a Statistics screen 901, an Emergency Shutdown screen 802, a Usage Modes screen, etc. To that end, and as shown e.g., in FIGS. 4L and 5A, the GUI 270 may include a quick launch bar 450 (e.g., along a bottom edge of the display screen) that includes a plurality of user controls 452, the selection of each of which may activate (or switch to) a different screen of the user interface 270. For example, selection of the user control 452-1 activates (launches or switches to) the Home screen 274. Selection of the user control 452-2 may activate (launches or switches to) the Power Flow screen 272. Selection of the user control 452-3 may activate (launch or switch to) the System START/STOP screen (see e.g., screen shots 801, 802, 803 in FIGS. 8A-8C). Selection of the user control 452-4 may activate, launch, or switch to the Statistics screen (see e.g., screen shot 901 in FIG. 9) and selection of the user control 452-5 may activate, launch, or switch to a Settings screen, which may provide different options for setting the user's application preferences and/or settings associated the power management system 101 itself. The various user controls may be provided in any arrangement in the quick launch bar 450, and in some embodiments fewer or additional user controls 452 than those illustrated may be included in one or more quick launch bars 450 of the application.

Figure 8C:
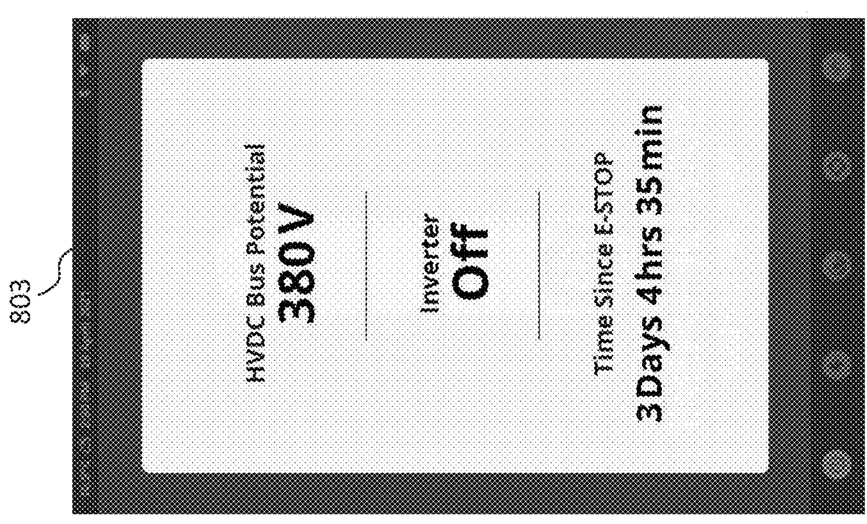
FIGS. 8A-8C shows yet additional examples of display screen associated with the graphical user interface according to the present disclosure.
Figure 8B:
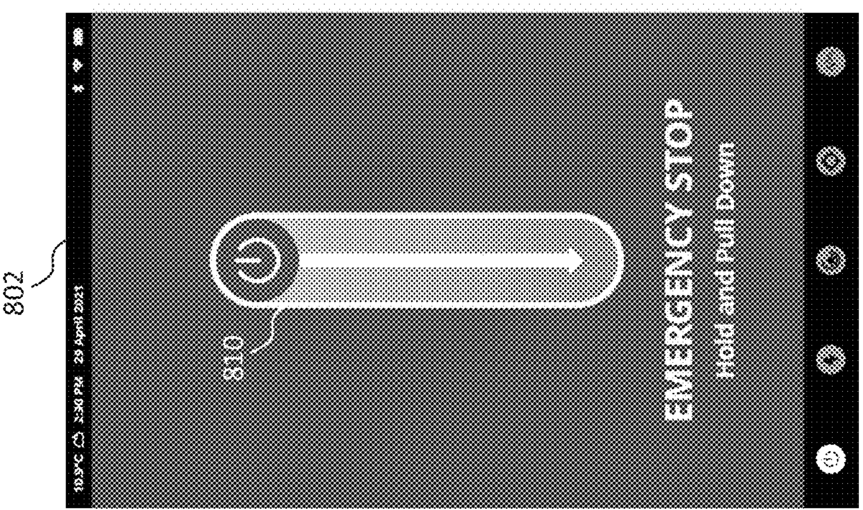
Figure 8A:
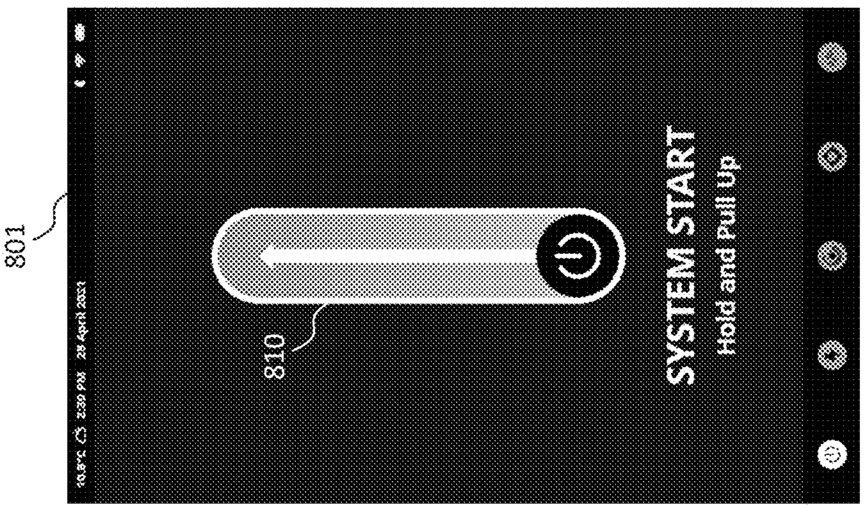

Referring to the screen shots 801-803 in FIGS. 8A-8C, as previously noted, the graphical user interface 270 may provide one or more user controls enabling the user to the control the power management system 101. For example, in an interface screen, which may be separate from the Power Flow screen 272 previously described (or the Home screen 274 to be described further below), the GUI 270 may provide a system start/stop control 810. Operation of the start/stop control 810 powers up or down, respectively, the electronic components (including the controller, inverter, DC bus, etc.) of the local power system 100. Any suitable user control type 810 may be used, such as a slider. The slider 810 may be of sufficient length to avoid accidental and unintentional start or stop of the system.

Toggling the control 810 to one state (e.g., sliding the slider button in a first direction) causes the system to power up, e.g. moving the slider control 810 from the position in screen shot 801 to the position in 803, while toggling the control 810 its opposite state (e.g., sliding the slider button in the opposite direction) causes the system to shut down. As such, the control 810 may act as an emergency stop, for example when the user is not physically near the energy storage unit 114 and/or may not be able to physically access the physical emergency stop of the storage unit 114. The slider 810 orientation may simulate conventional electrical switches, e.g. up to power on and down to power off, to provide an easy to understand and aesthetically pleasing feature for a user. The screen shot 803 shows an informational window that may be displayed, e.g., as an overlay on the System START/STOP screen or in a different screen such as upon launching the application, when the system 100 is powered down. The information window may provide a total voltage potential in the system, the On/Off status of a component of the system such as the inverter, or the amount of time since the system was activated or shut down. The START/STOP screen may be displayed on mobile device or tablet, enabling a user to activate or deactivate the system 100 from a remote location. Remote activation or deactivation may be beneficial during vacations or emergencies such as natural disasters, intense weather events, or where it would otherwise be difficult or inconvenient for a user to physically interact with the system 100.

Figure 6:
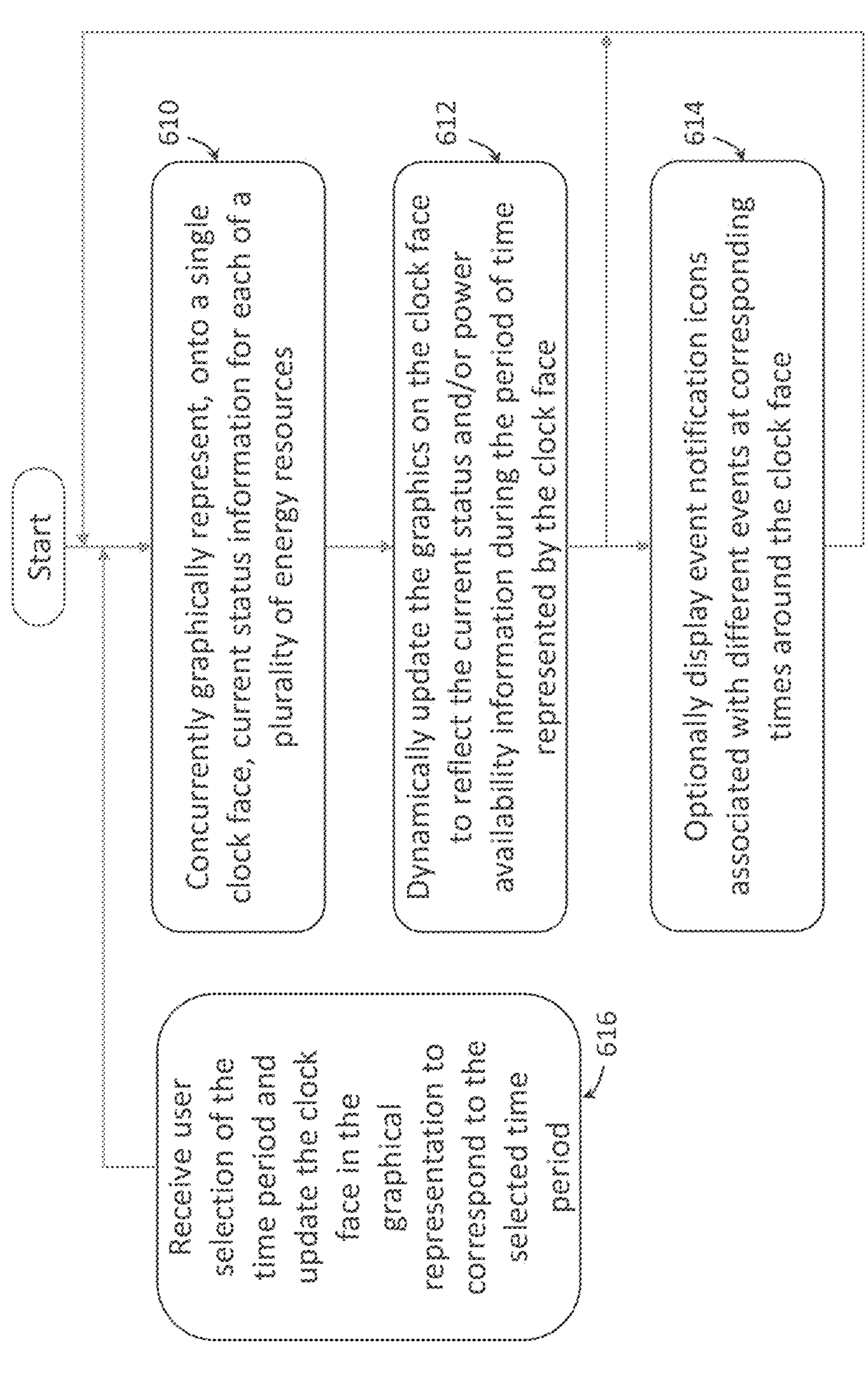
FIG. 6 shows a flow diagram of another process associated with the user interface of the power management system according to the present disclosure.

Returning to FIG. 6, a flow diagram of another process 600 that may be associated with the graphical user interface 270 according to the present disclosure is shown. The flow diagram in FIG. 6 shows an example process 600 for displaying status information, e.g., on the Home screen 274 of the GUI 270. The process 600 will be described further with reference also to FIGS. 7A-7J, which show various screen shots 701-710 of a Home screen 274 of the user interface 270 according to some embodiments herein. In some embodiments, the Home screen 274 may visually represent a dial (or clock face), which represents a predetermined period of time, preferably a 24-hour period or a 12-hour period. When displaying a 24-hour clock face, the 24 hour period on the dial reflects the 24 hours in any given day. Similarly, the 12-hour clock face displays each 12 hour portions of a day from midnight to 12 noon and from 12 noon to midnight at the user's local time.

In some embodiments, the Home Screen 274 provides a visual representation of the current and projected status of the local power system 100 displayed onto a dial (or clock face). On the home screen 274, information about various components of the local power system 100 are concurrently displayed onto the same dial. For example, the home screen 274 may display a first (or outer) ring or dial 730, which represents the expected time period over which the load 110 (e.g., residential home 112) will have power from any source (e.g., the battery 114, a dispatchable 104 resource such as the grid/utility or a generator, solar, etc.). In some embodiments, the outer ring 730 may be comprised of multiple layers, each of which communicates availability information about a particular resource of the system 100 (e.g., the grid 102, battery 114, solar 122, etc.) and which together provide information about power availability to the load 110. For example, and referring to the screen shot 703 in FIG. 7C, when all power resources fail (e.g., are depleted, experience an outage or otherwise become unavailable for providing power), the outer ring 730 may include an unfilled portion 732 that extends through the thickness of the outer ring 730. If the unfilled portion 752 is only through a part of the thickness (e.g., as shown by notch 752 in FIGS. 7A and 7B), then the outage may only affect one or a subset of the available resources, in the illustrated case that resource being the grid 102. Thus, when the outer ring 730 has a notch 752 only through part of the thickness of the ring 730, the load 110 (e.g., residential home 112) may not experience a power outage. In contrast, as may be shown in FIG. 7C, the system 101 has determined, and visually represented by the full-thickness of unfilled portion 732, an expected power outage to the load 110, in this case occurring between the hours of 4:30 am-8 am, during which a grid 102 outage is ongoing, the battery 114 (shown by the inner ring 720) has been depleted, and no solar power 122 is available (as shown by the center circle 714). Power availability during the clock face time period, and consequently the fill of the outer ring 730, may be determined by one or more of (1) the current and estimated (e.g., near term) power usage, (2) the current and estimated (e.g., near term) renewable power (e.g., solar) production, and, or (3) the current battery level. Power consumption by the load 110 may thus affect the duration of outage, as represented by the unfilled portion 732. In other words, if the user, noticing the predicted power outage, reduced power consumption, the duration of the outage may be reduced. For example, if the user, noticing the predicted outage, turned off one or more high-power appliances such as air conditioner and/or washer, the graphical representation 270 may update, in real-time, to show that based on the modified usage, the expected duration of the outage is reduced or the outage is eliminated altogether. The user can thus intelligently use and/or plan use of power during the day based on available resources.

In some embodiments, the different layers of the outer ring 730 (e.g., corresponding to different resources) may be uniquely colored with the color associated with the corresponding resource providing power. This configuration, however, may present a visually cluttered appearance to a user and thus in some embodiments, the outer (power availability) dial 730 may be colored in a single color even though it cumulatively represents (e.g., in layers) information about multiple resources. Generally, the resources may be arranged, from the outer layer inwardly, based or reliability. For example the most reliable resource, which is typically utility power in a grid application 102, may be represented by the outermost layer of the ring 730. Thus, the notch 752 in the outer ring 730 may indicate an outage of the grid 102. In other scenarios, such as in an off grid scenario, the most reliable resource may be another dispatchable resource 104 (e.g., a generator 105), and a notch 752 may indicate an expected outage e.g., due to anticipated depletion of the fuel. The dial 730 graphical representation 270 on the Home Screen 274 may further provide the current status of the battery 114 (e.g., an amount of time remaining of battery power) in the form of an inner ring 720. The inner ring 720 may be colored with the same color elsewhere associated with the battery 114 (e.g., as used in the graphical representation 270 in the Power flow screen 272). The inner ring 720 may have a portion 720-1 that is filled (e.g., with the color of the battery icon, or any other desired color) and a portion 720-2 that is unfilled. The filled portion 720-1 represents the amount of time of battery life (or charge) remaining, starting from the present time. As such, the filled portion 720-1 will typically extend from the dial hand 740 (or hour hand in the case of a 12-hour dial) and will terminate at the time in the future at which the battery 114 is expected to be depleted given the expected consumption and/or charging activity during that period of time. Finally, a central icon 712, for example a circle 714, may be displayed substantially at the center of the clock face, which represents the status (e.g., current energy output) of at least one renewable power source 106 (e.g., solar 122) connected to the system 100. In some embodiments, when multiple renewable sources 106 are connected, the central icon 712 may cumulatively represent status information (e.g., a combined current power output) of the multiple power sources 106. The color of the central icon 712 (e.g., the circle 714) may change from time to time to indicate the currently active resource and/or a primary resources (e.g., the one providing the majority of energy output) at any given time. In some embodiments, the central icon 712 may be set, e.g., by user input such as by a setting, to display information about only one of a plurality of connected renewable sources 106. As such, in the Home screen 274, the current status information for each of a plurality of resources may be concurrently, graphically (or visually) represented onto the clock face (as shown in step 610 of process 600). The term visually may imply that information is conveyed or represented visually or graphically rather than by or in addition to numerical data. In some embodiments, the status of all of the resources of the system 100 are concurrently visually represented onto the clock face. In preferred embodiments, information about the multiple resources may be represented by at least one graphic (e.g., the outer ring 730), preferably by two or more distinct graphics (e.g., the concentric outer 730 and inner rings 720, and optionally preferably including the center circle 714), to provide a user interface 270 which is visually easy to understand and has an aesthetically pleasing look. As is further shown in FIG. 6, the process 600 also includes dynamically updating the different graphics on the dial 730 in order to reflect the current status and/or power availability information at any given time during the period of time represented by the clock face (as shown in block 612 of FIG. 6). Optionally, the process 600 may include displaying event notification icons 760 associated with different events during the time period at corresponding times around the clock face (as shown in block 614 of FIG. 6). As shown in block 616, the system 100 may also receive a user selection of the time period and update the clock face in the graphical representation 270 to correspond to the selected time period.

Figure 7B:
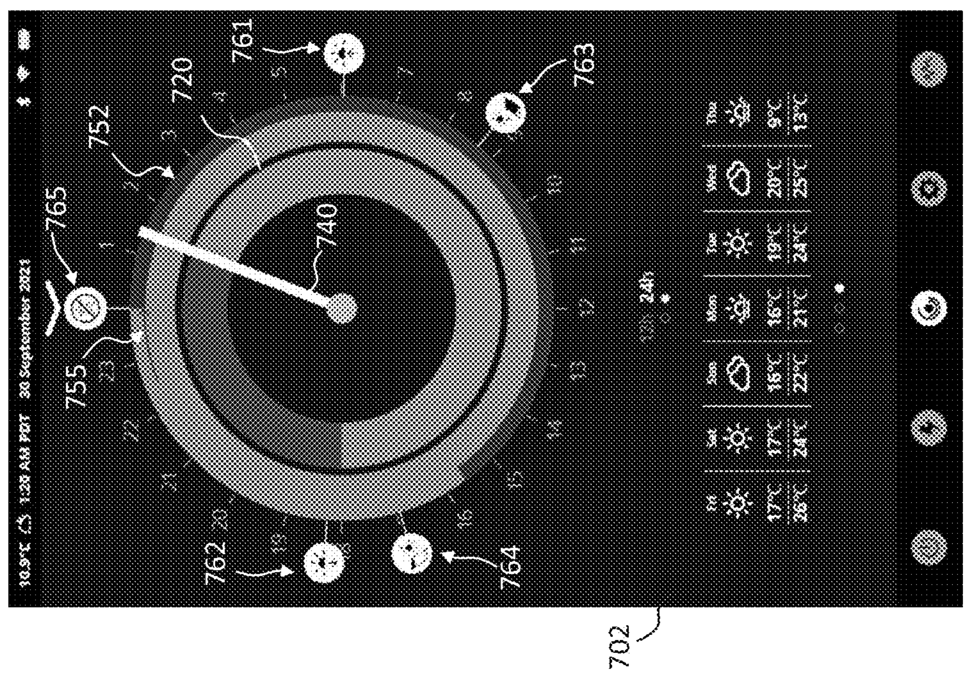
FIGS. 7A-7J shows various examples of another display screen of the graphical user interface according to the present disclosure.
Figure 7A:
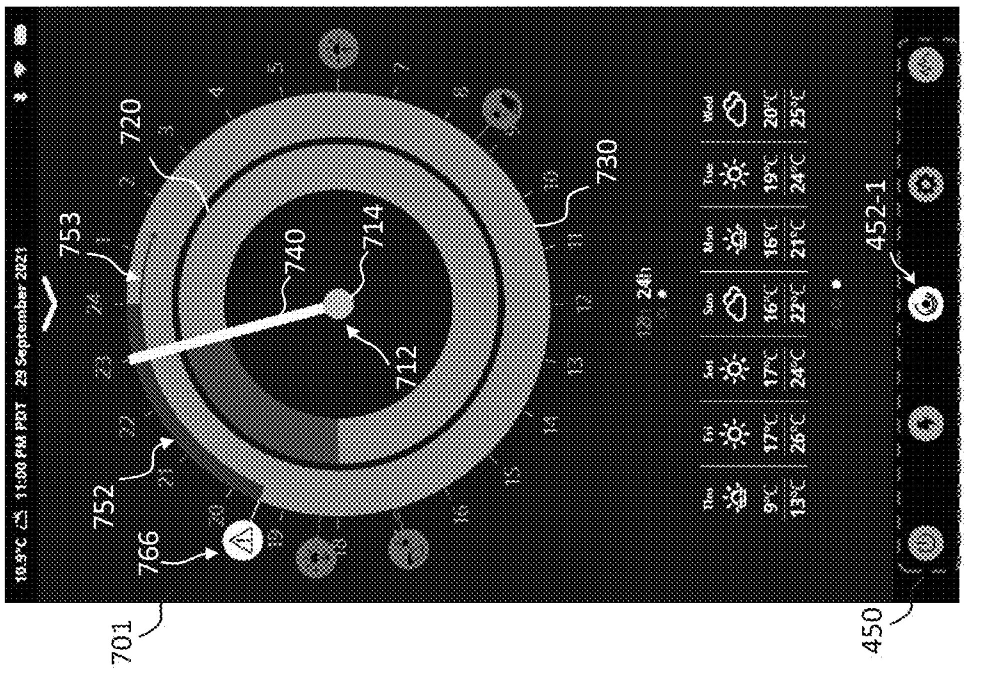
Figure 7D:
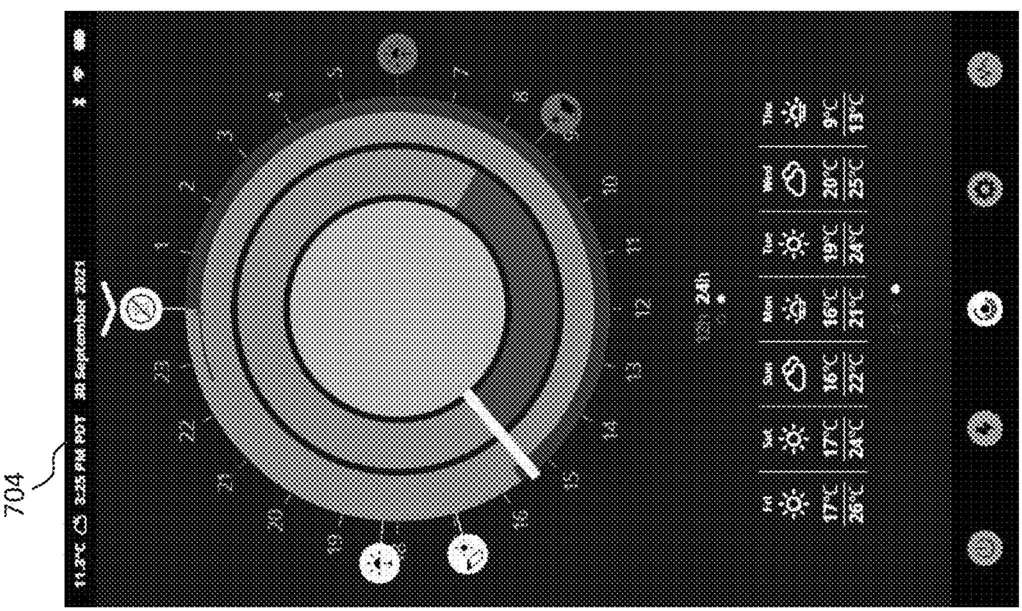

Referring to the example screen shot e.g., in FIG. 7A, status information about a renewable power source 106 (in this case, the solar array), and more specifically the output level of the power source (e.g., solar array 122) at any given time during the day, may be visually (or graphically) represented by a central icon 712, in this case a circle 714 located substantially at the center of the dial. The size of the circle 714 may dynamically change during the day to represent the varying output level of the array 122 (e.g., as can be seen between the screen shots in FIGS. 7C, 7D and 7E, each of which represents the solar output 122 at three different times during the dial's time period). The size of the circle 714 may vary dynamically during the day in a similar manner to the way that the size (or fill) of the annular region 428 of the solar icon 420-3 of the Power Flow screen 272 varies. While certain relationship are described here (such as common color coding or common formulas used to compute dynamic updates to the graphics) between the Home screen 274 and Power Flow screen 272, it is also envisioned that in some embodiments, the power management application 101 may only provide one of the Power Flow 272 and Home screens 274 and/or in combination with any of the other screens discussed herein. The color of the circle 714 in the example in FIG. 7A may corresponds to the unique color assigned to the particular renewable power source 106, for example yellow for solar 122.

The graphical representation 270 may further provide status information about the battery 114 by way of the inner circle or ring 720, which may encircles the central icon 710. In some examples, the inner ring 720 may be concentric with the central icon 710. The color of the inner ring 720 may be the unique color assigned to that particular component of the power management system 101, here specifically pink which may correspond to the battery 114. The fill level 720-1 of the ring 720 may visually provide the amount of time left to provide power from the battery 114 alone at a certain proxy consumption. The proxy consumption may be any one or more useful metrics, such as the instantaneous consumption, the average consumption over a recent time period, consumption of the specific power source in combination with additional power sources, or the forecasted consumption. The fill level 720-1 may be adjusted angularly, that is by filling (in color) the corresponding angular portion of the ring 720 equal to the time left on battery charge alone. Therefore, beginning at the hour hand 740 and going forward clockwise the ring 720 may represent the amount of time left to provide power from the battery 114 alone at a certain proxy consumption. If that amount is more than the 12 or 24 hours (or any other time period represented by a 360-degree circle) then the battery ring 720-1 (here in pink) will fill the entire ring 720.

Figure 7C:
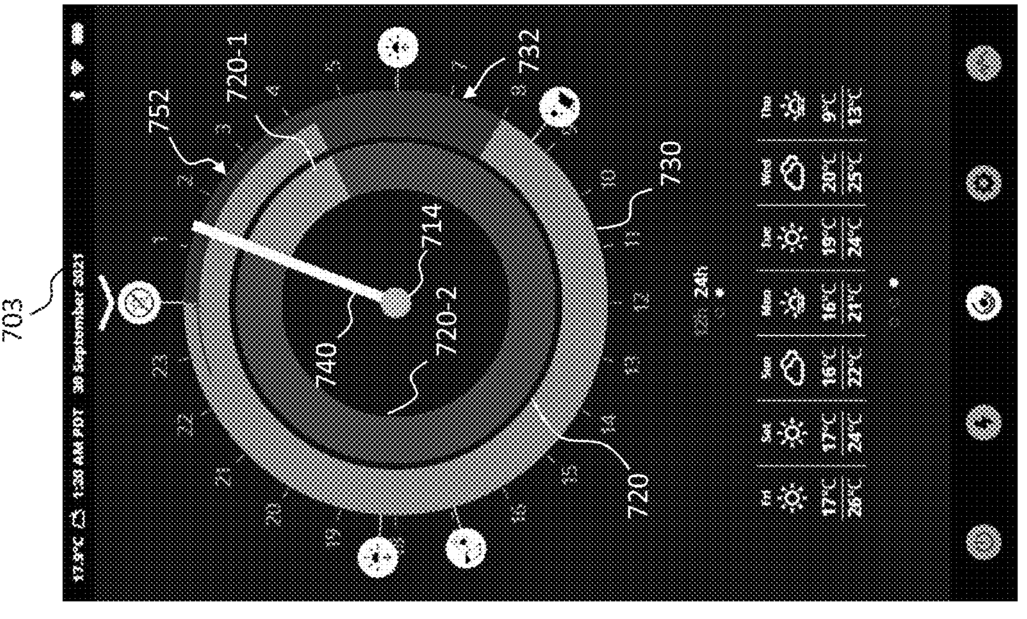

As described above, the graphical representation 270 may also provide status information about the availability of power from the various components (or resources) of the local power system 100 in the form of an outer circle or ring 730, which may encircle the inner ring 720 and thus also the central icon 710. The outer ring 730 may be concentric with either or both of the inner ring 720 or central icon 710. The outer ring 730, which may also be referred to as the power availability ring 730, is uniquely colored to represent the availability of power from the system 100 either from the battery 114 or all energy sources 106 and 107 or by a "passthrough" of grid power 102. In the present example, an outer segment of the ring 752, which may be about ⅓$^{rd}$ the thickness of the power availability ring 730, may represent the grid status 765. In other embodiments, the outer layer 752 may represent the status (current and predicted) for any other resource, for example the most reliable resource of the system 100. Filled and unfilled segments (through a portion or the full thickness of the ring) may visually represent availability or non-availability of power, respectively, at any given time during the time period represented by the clock face (e.g., during a 24 hour period). Thus, when an outer (e.g., ⅓$^{rd}$ thickness) segment 752 is unfilled, this may represent, in this scenario, a grid 102 outage. The inner segment (e.g., remaining ⅔$^{rd}$ thickness) of the ring 730 which may be the remaining thickness of the ring 730 may indicate whether the load 110 will be met by the resources of the local power system 100 or if the local power system 100 will be unable to deliver power to the load 110 (e.g., based on its expected usage of power). If load 110 can be met, there may be no full-thickness segments of the ring 730 that are unfilled, e.g. segment 732. As shown in FIG. 7C, if the power source indicated by the inner ring 720 has an expected time left based on consumption, and an additional power sources are experiencing outages as indicated by the notch 752, the fill level inner ring 720-1 and the remaining fill of the outer ring 730 may align to show that the system may be without power when the inner ring 720 power source is depleted. As noted, above, in some embodiments, the different layers (or thickness segments) of the outer ring 730 need not be the same color, although a same color may provide a visually less cluttered appearance. In some embodiments, the features, including the inner ring 720 and the outer ring 730, may be user-configurable (e.g., via a setting) to enable a user to have a more granular (color-coded) appearance of the outer (power availability) ring 730 or inner ring 720. In accordance with the present disclosure, the ring 730 may communicate, at any given time, current grid power status 765 (e.g., at the time when the user is viewing the Home screen 274 as reflected by the dial hand 740) as well the past and future (expected or predicted) status and whether load 110 will be served (or not) by the local power system 100 (e.g., at the time when the user is viewing the Home screen 274 as reflected by the dial hand 740) as well the past and future (expected or predicted) ability of the local power system 100 to serve load 110.

Grid 102 power outages may also be visually represented on the Home screen 274 by graying out, dimming, or removing a portion of the fill of the outer ring 730 that corresponds to the time segment during which the outage is occurring or is expected to occur. For example, referring to FIGS. 7A and 7B, a represented power outage began at 7:30 pm (represented by 19:30 hours on a 24 hour clock) and is ongoing at the time the screen shot 701 is captured (i.e., at 11 pm or 23:00 hours), as indicated by the grayed out (or unfilled) outer portion 752 of the corresponding angular segment of the outer ring 730. In this example, the grid power outage may be shown as expected to continue into the following day as indicated by arrow 753 extending from midnight angularly toward the morning hours. Similarly, in FIG. 7B, which shows the Home screen 274, now screen captured 702 on the following day, an arrow 755 pointing towards the 24:00 hour (or mid night hour) may represent that the power outage currently occurring, as represented by the grayed out portion 752, began in the preceding (e.g., 24 hour) time period. As such, the Home screen 274 is able to not only convey status information (e.g., grid power 102 availability) for the current (e.g., 24 hour) time period but also concurrently convey at least partial information about the preceding and/or upcoming time periods.

Additional information, e.g., information associated with various events occurring during the represented time period, may be presented to the user on the Home screen 274, e.g., in the form of event notification icons 760 (e.g., icons 761-766). These may include a sunrise icon 761 which may be displayed along the clock face at the time corresponding to the expected sunrise, a sunset icon 762 that may be displayed along the clock face at the time corresponding to the expected sunset, and, or first-light and last-light icons 763 and 764, respectively, which may indicate the expected times when light is first and last expected to hit the solar array 122, respectively. The icons 760 may include a symbol similar to or representative of the power source or information intended to be conveyed. For example, with reference to the sunrise 761 and sunset icons 762, the icons may show a portion of a sun similar to the inner graphic 426 of the solar icon 420-3 in addition to an arrow within the graphic indicating sunrise or sunset. The time of day of the occurrence of each of these events may vary from day to day, and current day information may be obtained from a reliable source (e.g., via an internet connection to the National Weather Service website or other similar service), historical data, third party applications, or user input information. In some embodiments, the associated times of these icons 460 may also be based on local geography and/or installation aspects (e.g., direction of the solar array 122) and thus the event icons 760 may further reference information provided to the application by a user (e.g., an installer and/or the end-user, such as during set up of the system 100). As the day progresses and one or more these events fall in the past, the associated event notification icon may be grayed out (or dimmed) or otherwise visually de-emphasized (e.g., as shown in FIG. 7A). One or more event notification icons (e.g., icons 765 and 766) may be used to indicate an expected and/or ongoing grid power outage 765 or to convey information about other events 766. Similar to sunrise and sunset information, information about grid outages 765 may be obtained from any reliable source (e.g., the local power utility) via the system's network connection. The grid power outage icon 765 may show an icon representative of the grid 102, which may be similar to the inner graphic 426 of the icon 420-5 including a symbol indicating the grid 102 may be disconnected or no power is available from the grid 102. For example, a circle with an angled line through the interior over the symbol indicating the grid 102 may indicate a grid power outage. Outages or notification icons 760 for additional power sources may similarly be displayed by with symbol matching, or similar to, inner graphics 426 from the icons 420 shown in FIGS. 4A-4L.

Figure 7F:
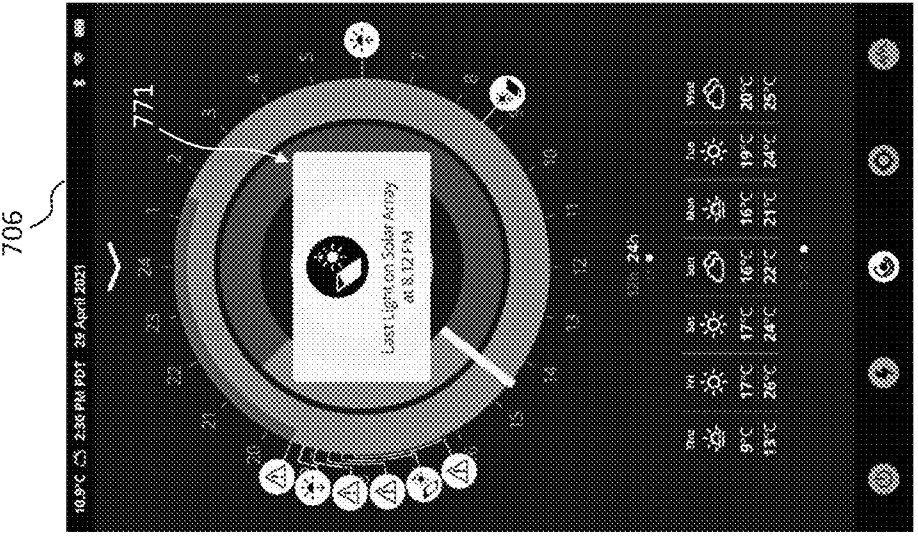
Figure 7E:
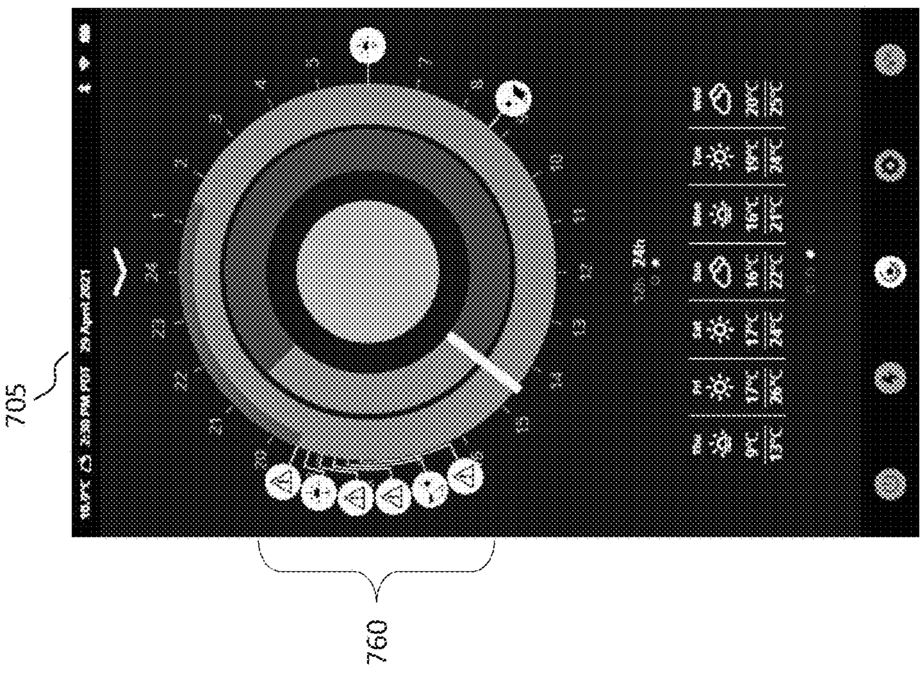
Figure 7H:
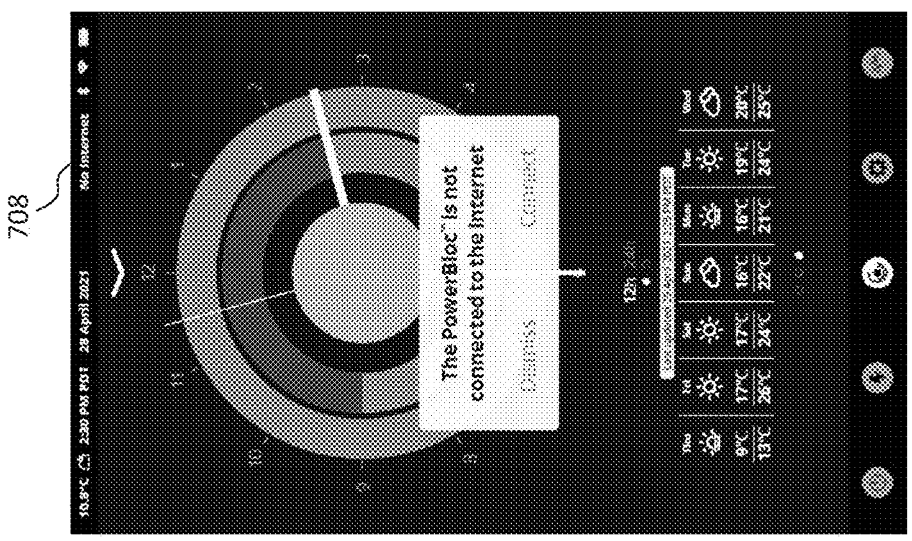
Figure 7G:
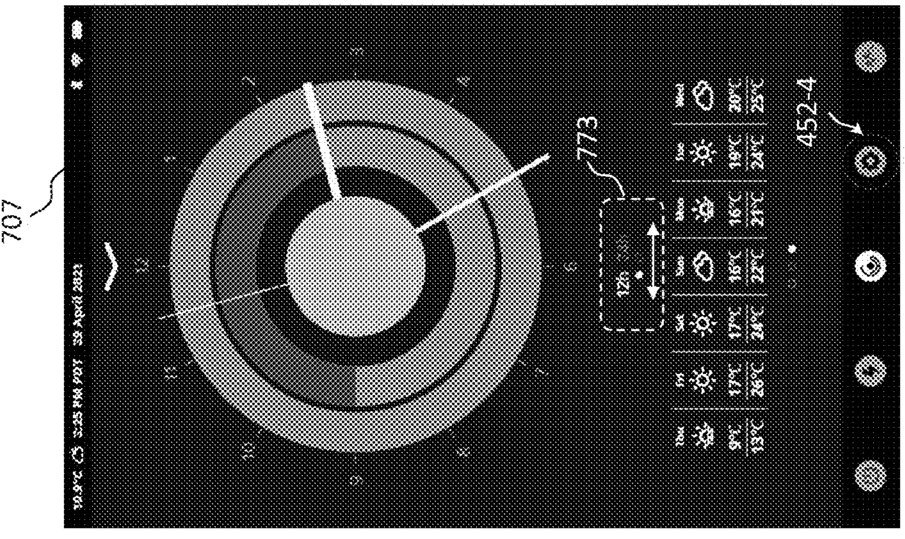
Figure 7J:
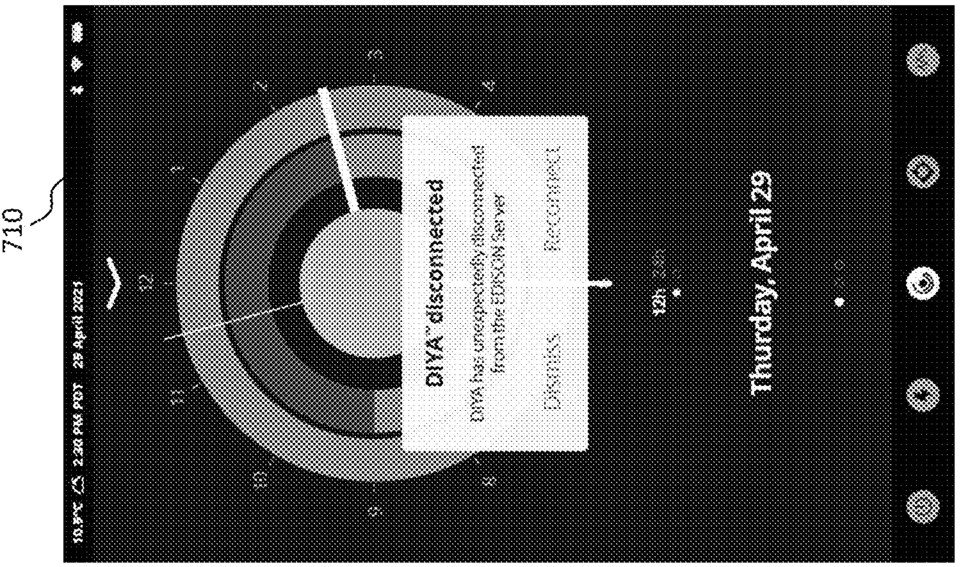
Figure 7I:
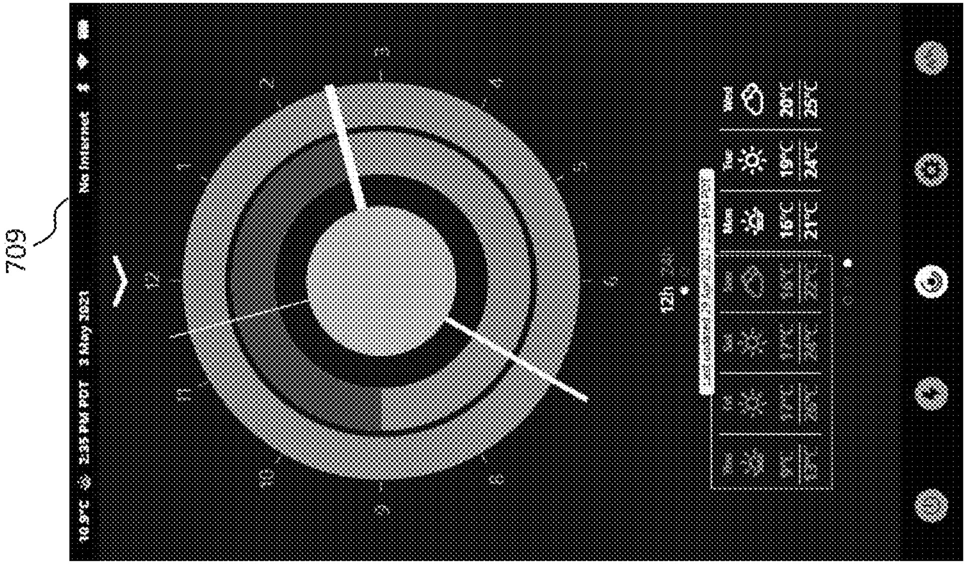

FIGS. 7E-7J show additional example screen shots, 705-710 of the Home screen 274. In the screen shot 705 in FIG. 7E, a plurality of event notification icons 760 are clustered near a closely spaced time frame on the clock face and the timing of the various event notification icons 760 is identified by a lead line connecting the event icon to the corresponding time. The screen shot 706 in FIG. 7F shows an example of information widow 771 (e.g., an overlay) that may be presented to the user responsive to selection of any of the notification icons 760. This overlay 771 may display additional information about a selected event (e.g., by clicking on one of the event notification icons 760 which may be icon 764 in FIG. 7F). For example, overlay 771 may provide the exact time of the last light icon 764 notification, as well as a brief description or name of the icon 764. As previously described, and referring now to the examples in FIGS. 7G-7J, the clock face may represent a 12-hour time period instead of a 24-hour time period. In some embodiments, the user interface 270 may enable the user to easily select, or switch between, the available time period configurations (e.g., by swiping time period icon 773 as shown in FIG. 7G). In some embodiments, this selection may be available via a setting, such as on the Setting screen activated by selecting icon 452-4. In the 12-hour time period configuration, the dial 730 may be configured to display additional dial hands 740, such as a minute dial hand and/or a second dial hand. Otherwise, the graphical representation 270 of status (e.g., graphics 710, 720 and 730) may similarly represent the same information as in the 24-hour clock face except for the shorter period of time (e.g., 12 hours rather than 24 hours). In some embodiments, various alerts may be generated and/or displayed, such as when the system 100 is not communicatively connected to a desired wireless network (e.g., to the internet), as shown in the screen shot 708 in FIG. 7H. Additionally, or alternatively, certain information (e.g., weather, events) which the application is unable to update at a given time, e.g., due to the lack of connectivity to the network, or information may be grayed out as shown in FIG. 7I to communicate to the user that the information in the display may be out of date or shows information regarding previous days. The user may be alerted to various connectivity issues, for example a lack of connection to the internet (e.g., as shown in FIG. 7H) and/or lack of connection of the power management application to the controller (or server) 210, e.g., as in the example shown in FIG. 7J.

Figure 9:
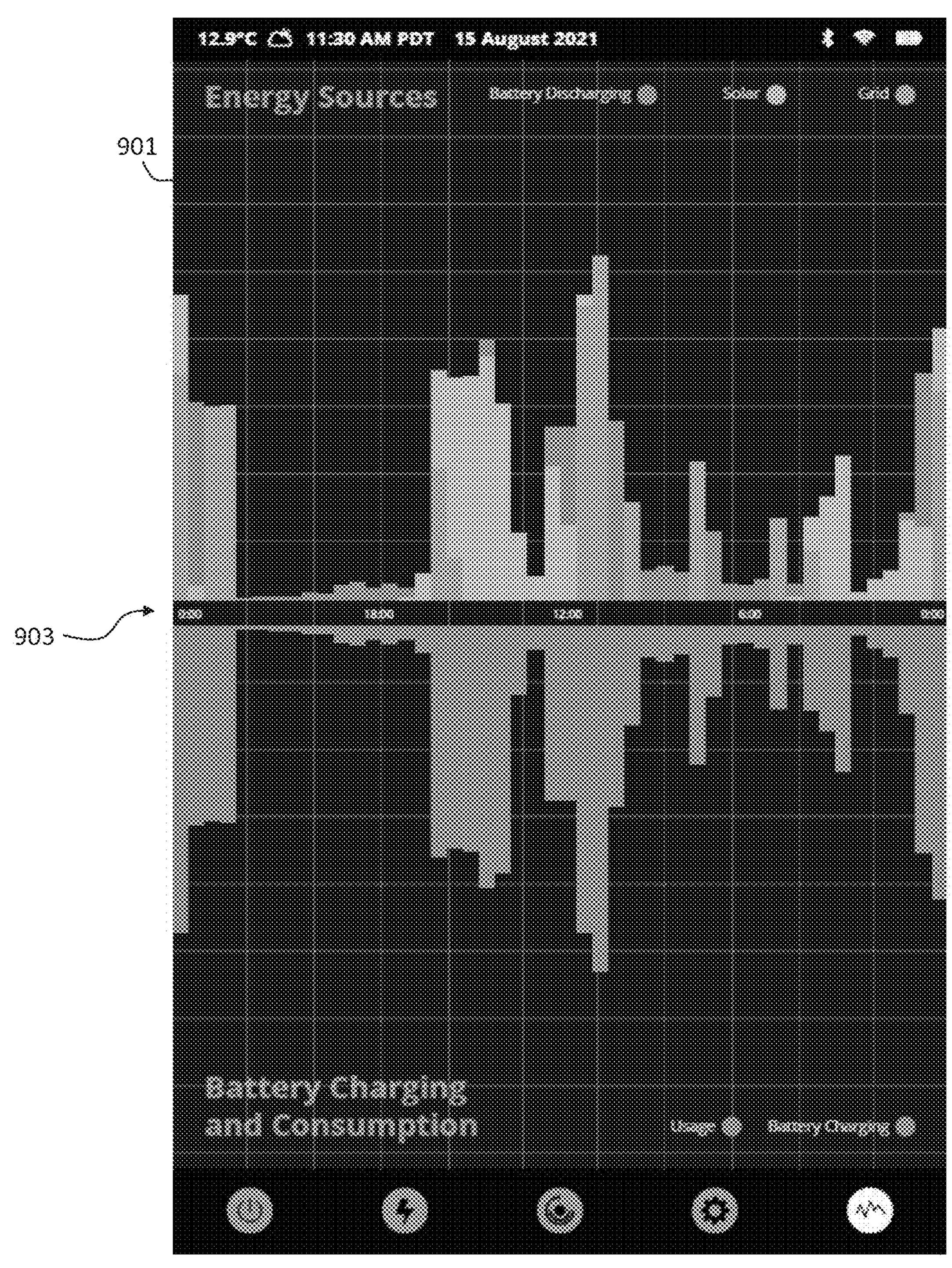
FIG. 9 shows yet another display screen associated with some embodiments of the user interface described herein.

FIG. 9 shows a screen shot 901 of a Statistics screen, which provides historical information about the power generation and consumption of components of the system 100. Specifically, in the bar chart in the example in FIG. 9, the X-axis 903 may represent time. In some embodiments, the time period reflected on the X-axis 903 may default to the same time period as reflected by the clock face of the Home screen 274 (e.g., 24 hours, 12 hours). In some embodiments, the time period represented by the X-axis 903 may default to 24 hours and may further be, optionally, adjustable by the user. The energy sources may be shown above the axis 903, while the energy sinks may be shown below. In general, and ignoring minor losses in the system 100, the sum energy sources and sum sinks at any time should mirror one another. For example, any energy provided to the DC bus by a power source, such as energy produced by solar 122 or by a generator 105, may be consumed by the load 110 (e.g., as shown by the majority of the bars, shown in orange in this example, on the bottom side of the axis) or it may be used to charge the battery 114 (as shown in pink in this example) when excess power is generated. Additionally, power may be shown as being directed to the grid 102 if more power is provided by the power sources than the load 110 or battery 114 may use. The power provided into the system 100 by the various power sources can be easily seen through the color coding that may match the icons 420 or colors of the Power Flow screen 272. Thus, via this screen the user may easily and quickly visualize system performance (e.g., visualize if the various renewable sources are performing as expected and/or whether power consumption is as expected).

The foregoing discussion has been presented for purposes of illustration and description and is not intended to limit the disclosure to the form or forms disclosed herein. For example, various features of the disclosure are grouped together in one or more aspects, embodiments, or configurations for the purpose of streamlining the disclosure. However, various features of the certain aspects, embodiments, or configurations of the disclosure may be combined in alternate aspects, embodiments, or configurations. Moreover, the following claims are hereby incorporated into this Detailed Description by this reference, with each claim standing on its own as a separate embodiment of the present disclosure. All directional references (e.g., proximal, distal, upper, lower, upward, downward, left, right, lateral, longitudinal, front, back, top, bottom, above, below, vertical, horizontal, radial, axial, clockwise, and counterclockwise) are only used for identification purposes to aid the reader's understanding of the present disclosure, and do not create limitations, particularly as to the position, orientation, or use. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Identification references (e.g., primary, secondary, first, second, third, fourth, etc.) are not intended to connote importance or priority, but are used to distinguish one feature from another. The drawings are for purposes of illustration only and the dimensions, positions, order and relative sizes reflected in the drawings attached hereto may vary.

The invention claimed is:

1. A power management system comprising a controller configured to receive status information for at least two power sources coupled to the power management system and to provide energy to a load connected to the power management system; and a computing device in communication with the controller, wherein the computing device comprises:

a display;

a processor in communication with the display; and a memory in communication with the processor, the memory comprising instructions, which when executed by the processor, cause a graphical user interface to be provided on the display, wherein the graphical user interface is configured to:

concurrently display the corresponding status information of each of the at least two power sources, wherein, the status of the at least two power sources is each graphically represented on a clock face by a different circular status graphic concurrently displayed with the clock face and dynamically updated during a period of time represented by the clock face, the at least two power sources include an off-grid power source and a second power source;

an off-grid status of the off-grid power source is represented by a circle located at a center of the clock face, a size of the circle varying during the period of time to reflect power output by the off-grid power source, the circle having a first color corresponding to the off-grid power source;

a second power source status of the second power source is represented by an inner ring exterior to the circle, the inner ring having a second color corresponding to the second power source; and a load status of the load is represented by an outer ring concentric exterior to the circle and inner ring, the outer ring having a third color corresponding to the load.

2. The power management system of claim 1, wherein the graphical user interface is configured to enable a user to toggle between representing the clock face by a first clock face representing a 12-hour period and a second clock face representing a 24-hour period and wherein each different circular status graphic is dynamically updated to the selected period of time responsive to the toggle.

3. The power management system of claim 1, wherein the graphical user interface is configured to include a plurality of event notification icons, each arranged at a corresponding estimated time around the clock-face.

4. The power management system of claim 1, wherein each of the inner ring and the outer ring are shaded in at least two colors at different radial locations to represent availability of power for a range of time.

5. The power management system of claim 1, wherein the inner ring and the outer ring are configured to display status information for a segment of time immediately preceding or following the period of time.

6. The power management system of claim 1, wherein the status information for the load includes:

an arrow indicating a power outage of at least one of the least two power sources preceding or extending into the selected time period.

* * * * *